United States Patent
Gaal et al.

(10) Patent No.: US 10,693,698 B2
(45) Date of Patent: Jun. 23, 2020

(54) TECHNIQUES FOR CARRIER SHARING BETWEEN RADIO ACCESS TECHNOLOGIES

(71) Applicant: QUALCOMM Incorporated, San Diego, CA (US)

(72) Inventors: Peter Gaal, San Diego, CA (US); Yi Huang, San Diego, CA (US); Alexei Yurievitch Gorokhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 39 days.

(21) Appl. No.: 16/012,717

(22) Filed: Jun. 19, 2018

(65) Prior Publication Data

US 2018/0375705 A1    Dec. 27, 2018

Related U.S. Application Data

(60) Provisional application No. 62/523,248, filed on Jun. 21, 2017.

(51) Int. Cl.
*H04L 27/26* (2006.01)
*H04W 16/14* (2009.01)
(Continued)

(52) U.S. Cl.
CPC ........ *H04L 27/265* (2013.01); *H04B 1/005* (2013.01); *H04J 11/005* (2013.01);
(Continued)

(58) Field of Classification Search
None
See application file for complete search history.

(56) References Cited

U.S. PATENT DOCUMENTS

2017/0251493 A1*  8/2017  Zhang ................ H04L 27/2626
2018/0035416 A1*  2/2018  Yi ........................ H04L 5/0037
(Continued)

OTHER PUBLICATIONS

AT&T: "Remaining Details of NR-LTE Coexistence in Overlapping Spectrum", 3GPP Draft; R1-1710417 ATT Coexistence, 3rd Generation Partnership Project (3GPP), Mobile Competence Centre; 650, Route Des Lucioles; F-06921 Sophia-Antipolis Cedex; France, vol. RAN WG1, No. Qingdao, P.R. China; Jun. 27, 2017-Jun. 30, 2017, Jun. 17, 2017 (Jun. 17, 2017), 4 Pages, XP051305016, Retrieved from the Internet: URL: http://www.3gpp.org/ftp/tsg_ran/WG1_RL1/TSGR1_AH/NR_AH_1706/Docs/ [retrieved on Jun. 17, 2017].

(Continued)

*Primary Examiner* — Saumit Shah
(74) *Attorney, Agent, or Firm* — Holland & Hart LLP/Qualcomm

(57) ABSTRACT

Techniques are described herein for addressing tone misalignment between signals of a first radio access technology (RAT) and signals of a second RAT in a combined signal. In some wireless communications systems, the tones of uplink (UL) signals may be shifted up or down based on the configuration of the particular RAT. If UL signals of the first RAT are not shifted in frequency and UL signals of the second RAT are shifted in frequency, processing the combined signal may include additional processing to account for the mismatch.

28 Claims, 19 Drawing Sheets

(51) Int. Cl.
*H04B 1/00* (2006.01)
*H04J 11/00* (2006.01)

(52) U.S. Cl.
CPC ...... *H04L 27/2602* (2013.01); *H04L 27/2626* (2013.01); *H04W 16/14* (2013.01)

(56) References Cited

U.S. PATENT DOCUMENTS

| | | | |
|---|---|---|---|
| 2018/0091337 A1* | 3/2018 | Wilhelmsson | H04L 27/0008 |
| 2018/0192404 A1* | 7/2018 | Maaref | H04L 5/0094 |
| 2018/0368153 A1* | 12/2018 | Li | H04W 72/12 |

OTHER PUBLICATIONS

International Search Report and Written Opinion—PCT/US2018/038583—ISA/EPO—Sep. 26, 2018 (175057WO).
Samsung: "LTE-NR Coexistence for UL", 3GPP Draft; R1-1705436 LTE-NR Coexistence for UL-Samsung, 3rd Generation Partnership Project (3GPP), Mobile Competence Centre; 650, Route Des lucioles; F-06921 Sophia-Antipolis Cedex; France, vol. RAN WG1, No. Spokane, USA; Apr. 3, 2017-Apr. 7, 2017, Apr. 2, 2017 (Apr. 2, 2017), pp. 1-8, XP051243566, Retrieved from the Internet: URL: http://www.3gpp.org/ftp/Meetings_3GPP_SYNC/RAN1/Docs/ [retrieved on Apr. 2 2017].

* cited by examiner

TECHNIQUES FOR CARRIER SHARING BETWEEN RADIO ACCESS TECHNOLOGIES

CROSS REFERENCES

The present application for patent claims priority to U.S. Provisional Patent Application No. 62/523,248 by Gaal, et al., entitled "Techniques For Carrier Sharing Between Radio Access Technologies," filed Jun. 21, 2017, assigned to the assignee hereof. The provisional application is incorporated by reference herein.

BACKGROUND

The following relates generally to wireless communication, and more specifically to techniques for carrier sharing between radio access technologies.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

SUMMARY

A method of wireless communication is described. The method may include receiving a combined signal that includes signals of a first radio access technology (RAT) and signals of a second RAT that are frequency domain multiplexed in a same subframe, identifying a first transmit (Tx) direct current (DC) location corresponding to the signals of the first RAT, identifying a second Tx DC location corresponding to the signals of the second RAT, selecting one of the first Tx DC location or the second Tx DC location as a common receive (Rx) DC location, performing a common Rx fast Fourier transform (FFT) on the combined signal based on the common Rx DC location, and decoding the signals of the first RAT and the signals of the second RAT based on an output of the common Rx FFT.

An apparatus for wireless communication is described. The apparatus may include means for receiving a combined signal that includes signals of a first RAT and signals of a second RAT that are frequency domain multiplexed in a same subframe, means for identifying a first Tx DC location corresponding to the signals of the first RAT, means for identifying a second Tx DC location corresponding to the signals of the second RAT, means for selecting one of the first Tx DC location or the second Tx DC location as a common Rx DC location, means for performing a common Rx FFT on the combined signal based on the common Rx DC location, and means for decoding the signals of the first RAT and the signals of the second RAT based on an output of the common Rx FFT.

Another apparatus for wireless communication is described. The apparatus may include a processor, memory in electronic communication with the processor, and instructions stored in the memory. The instructions may be operable to cause the processor to receive a combined signal that includes signals of a first RAT and signals of a second RAT that are frequency domain multiplexed in a same subframe, identify a first Tx DC location corresponding to the signals of the first RAT, identify a second Tx DC location corresponding to the signals of the second RAT, select one of the first Tx DC location or the second Tx DC location as a common Rx DC location, perform a common Rx FFT on the combined signal based on the common Rx DC location, and decode the signals of the first RAT and the signals of the second RAT based on an output of the common Rx FFT.

A non-transitory computer readable medium for wireless communication is described. The non-transitory computer-readable medium may include instructions operable to cause a processor to receive a combined signal that includes signals of a first RAT and signals of a second RAT that are frequency domain multiplexed in a same subframe, identify a first Tx DC location corresponding to the signals of the first RAT, identify a second Tx DC location corresponding to the signals of the second RAT, select one of the first Tx DC location or the second Tx DC location as a common Rx DC location, perform a common Rx FFT on the combined signal based on the common Rx DC location, and decode the signals of the first RAT and the signals of the second RAT based on an output of the common Rx FFT.

In some examples of the method, apparatus, and non-transitory computer-readable medium described above, the first Tx DC location and the second Tx DC location vary by a half tone shift. In some examples of the method, apparatus, and non-transitory computer-readable medium described above, the first RAT applies a half tone shift to uplink (UL) communications. In some examples of the method, apparatus, and non-transitory computer-readable medium described above, the first DC location may be selected as the common Rx DC location.

Some examples of the method, apparatus, and non-transitory computer-readable medium described above may further include processes, features, means, or instructions for applying a half tone rotation to the combined signal prior to performing the common Rx FFT.

In some examples of the method, apparatus, and non-transitory computer-readable medium described above, decoding the signals of the first RAT and the signals of the second RAT comprises: separating the output of the common Rx FFT into resource blocks (RBs) associated with the first RAT and RBs associated with the second RAT. Some examples of the method, apparatus, and non-transitory computer-readable medium described above may further include processes, features, means, or instructions for processing the RBs associated with the second RAT by applying a respective complex phase compensation value to each tone output.

In some examples of the method, apparatus, and non-transitory computer-readable medium described above, the second DC location may be selected as the common Rx DC location. In some examples of the method, apparatus, and non-transitory computer-readable medium described above, decoding the signals of the first RAT and the signals of the second RAT comprises: separating the output of the common Rx FFT into RBs associated with the first RAT and RBs associated with the second RAT. Some examples of the method, apparatus, and non-transitory computer-readable medium described above may further include processes, features, means, or instructions for processing the RBs associated with the first RAT by applying a respective complex phase compensation value to each tone output.

In some examples of the method, apparatus, and non-transitory computer-readable medium described above, decoding the signals of the first RAT and the signals of the second RAT comprises: separating the output of the common Rx FFT into RBs associated with the first RAT and RBs associated with the second RAT. Some examples of the method, apparatus, and non-transitory computer-readable medium described above may further include processes, features, means, or instructions for processing either the RBs associated with the first RAT or the RBs associated with the second RAT by applying a respective complex phase compensation value to each tone output.

In some examples of the method, apparatus, and non-transitory computer-readable medium described above, processing either the RBs associated with the first RAT or the RBs associated with the second RAT comprises: multiplying each tone output by the respective complex phase compensation value.

In some examples of the method, apparatus, and non-transitory computer-readable medium described above, the respective complex phase compensation values may be each based on a symbol index, a cyclic prefix (CP) type, or a combination thereof.

Some examples of the method, apparatus, and non-transitory computer-readable medium described above may further include processes, features, means, or instructions for determining the respective complex phase compensation values via a look-up table (LUT) or through computation.

A method of wireless communication is described. The method may include encoding signals of a first RAT and signals of a second RAT into first RBs and second RBs, respectively, identifying a first Tx DC location corresponding to the signals of the first RAT, identifying a second Tx DC location corresponding to the signals of the second RAT, selecting one of the first Tx DC location or the second Tx DC location as a common Tx DC location, performing a common Tx inverse fast Fourier transform (iFFT) on the first RBs and the second RBs based on the common Tx DC location, and transmitting a combined signal that includes the signals of the first RAT and the signals of the second RAT frequency domain multiplexed in a same subframe, based on an output of the common Tx iFFT.

An apparatus for wireless communication is described. The apparatus may include means for encoding signals of a first RAT and signals of a second RAT into first RBs and second RBs, respectively, means for identifying a first Tx DC location corresponding to the signals of the first RAT, means for identifying a second Tx DC location corresponding to the signals of the second RAT, means for selecting one of the first Tx DC location or the second Tx DC location as a common Tx DC location, means for performing a common Tx iFFT on the first RBs and the second RBs based on the common Tx DC location, and means for transmitting a combined signal that includes the signals of the first RAT and the signals of the second RAT frequency domain multiplexed in a same subframe, based on an output of the common Tx iFFT.

Another apparatus for wireless communication is described. The apparatus may include a processor, memory in electronic communication with the processor, and instructions stored in the memory. The instructions may be operable to cause the processor to encode signals of a first RAT and signals of a second RAT into first RBs and second RBs, respectively, identify a first Tx DC location corresponding to the signals of the first RAT, identify a second Tx DC location corresponding to the signals of the second RAT, select one of the first Tx DC location or the second Tx DC location as a common Tx DC location, perform a common Tx iFFT on the first RBs and the second RBs based on the common Tx DC location, and transmit a combined signal that includes the signals of the first RAT and the signals of the second RAT frequency domain multiplexed in a same subframe, based on an output of the common Tx iFFT.

A non-transitory computer readable medium for wireless communication is described. The non-transitory computer-readable medium may include instructions operable to cause a processor to encode signals of a first RAT and signals of a second RAT into first RBs and second RBs, respectively, identify a first Tx DC location corresponding to the signals of the first RAT, identify a second Tx DC location corresponding to the signals of the second RAT, select one of the first Tx DC location or the second Tx DC location as a common Tx DC location, perform a common Tx iFFT on the first RBs and the second RBs based on the common Tx DC location, and transmit a combined signal that includes the signals of the first RAT and the signals of the second RAT frequency domain multiplexed in a same subframe, based on an output of the common Tx iFFT.

In some examples of the method, apparatus, and non-transitory computer-readable medium described above, the first Tx DC location and the second Tx DC location vary by a half tone shift. In some examples of the method, apparatus, and non-transitory computer-readable medium described above, the first RAT applies a half tone shift to UL communications.

In some examples of the method, apparatus, and non-transitory computer-readable medium described above, the first DC location may be selected as the common Tx DC location.

In some examples of the method, apparatus, and non-transitory computer-readable medium described above, encoding the signals of the first RAT and the signals of the second RAT comprises: processing the RBs associated with the second RAT by applying a respective complex phase compensation value to each tone input.

Some examples of the method, apparatus, and non-transitory computer-readable medium described above may further include processes, features, means, or instructions for applying a half tone rotation to the combined signal after performing the common Tx iFFT and before transmitting the combined signal.

In some examples of the method, apparatus, and non-transitory computer-readable medium described above, the second DC location may be selected as the common Tx DC location.

In some examples of the method, apparatus, and non-transitory computer-readable medium described above, encoding the signals of the first RAT and the signals of the second RAT comprises: processing the RBs associated with the first RAT by applying a respective complex phase compensation value to each tone input.

In some examples of the method, apparatus, and non-transitory computer-readable medium described above, encoding the signals of the first RAT and the signals of the second RAT comprises: processing either the RBs associated with the first RAT or the RBs associated with the second RAT by applying a respective complex phase compensation value to each tone input.

In some examples of the method, apparatus, and non-transitory computer-readable medium described above, processing either the RBs associated with the first RAT or the RBs associated with the second RAT comprises: multiplying each tone output by the respective complex phase compensation value.

In some examples of the method, apparatus, and non-transitory computer-readable medium described above, the respective complex phase compensation values may be each based on a symbol index, a CP type, or a combination thereof.

Some examples of the method, apparatus, and non-transitory computer-readable medium described above may further include processes, features, means, or instructions for determining the respective complex phase compensation values via a LUT or through computation.

A method of wireless communication is described. The method may include receiving a combined signal that includes signals of a first RAT and signals of a second RAT that are frequency domain multiplexed in a same subframe, identifying a first Tx DC location corresponding to the signals of the first RAT, performing a first Rx FFT on the combined signal based on the first Rx DC location, identifying a second Tx DC location corresponding to the signals of the second RAT, performing a second Rx FFT on a duplicate of the combined signal based on the second Rx DC location, and decoding the signals of the first RAT and the signals of the second RAT based on an output of the first Rx FFT and the second Rx FFT.

An apparatus for wireless communication is described. The apparatus may include means for receiving a combined signal that includes signals of a first RAT and signals of a second RAT that are frequency domain multiplexed in a same subframe, means for identifying a first Tx DC location corresponding to the signals of the first RAT, means for performing a first Rx FFT on the combined signal based on the first Rx DC location, means for identifying a second Tx DC location corresponding to the signals of the second RAT, means for performing a second Rx FFT on a duplicate of the combined signal based on the second Rx DC location, and means for decoding the signals of the first RAT and the signals of the second RAT based on an output of the first Rx FFT and the second Rx FFT.

Another apparatus for wireless communication is described. The apparatus may include a processor, memory in electronic communication with the processor, and instructions stored in the memory. The instructions may be operable to cause the processor to receive a combined signal that includes signals of a first RAT and signals of a second RAT that are frequency domain multiplexed in a same subframe, identify a first Tx DC location corresponding to the signals of the first RAT, perform a first Rx FFT on the combined signal based on the first Rx DC location, identify a second Tx DC location corresponding to the signals of the second RAT, perform a second Rx FFT on a duplicate of the combined signal based on the second Rx DC location, and decode the signals of the first RAT and the signals of the second RAT based on an output of the first Rx FFT and the second Rx FFT.

A non-transitory computer readable medium for wireless communication is described. The non-transitory computer-readable medium may include instructions operable to cause a processor to receive a combined signal that includes signals of a first RAT and signals of a second RAT that are frequency domain multiplexed in a same subframe, identify a first Tx DC location corresponding to the signals of the first RAT, perform a first Rx FFT on the combined signal based on the first Rx DC location, identify a second Tx DC location corresponding to the signals of the second RAT, perform a second Rx FFT on a duplicate of the combined signal based on the second Rx DC location, and decode the signals of the first RAT and the signals of the second RAT based on an output of the first Rx FFT and the second Rx FFT.

In some examples of the method, apparatus, and non-transitory computer-readable medium described above, decoding the signals of the first RAT and the signals of the second RAT comprises: discarding RBs associated with the second RAT while decoding the signals of the first RAT. Some examples of the method, apparatus, and non-transitory computer-readable medium described above may further include processes, features, means, or instructions for discarding RBs associated with the first RAT while decoding the signals of the second RAT.

In some examples of the method, apparatus, and non-transitory computer-readable medium described above, the combined signal may be a result of multi-user multiple-input multiple-output (MU-MIMO) communications.

Some examples of the method, apparatus, and non-transitory computer-readable medium described above may further include processes, features, means, or instructions for applying a half tone rotation to the combined signal prior to performing the first Rx FFT.

In some examples of the method, apparatus, and non-transitory computer-readable medium described above, decoding the signals of the first RAT and the signals of the second RAT comprises: separating the output of the first Rx FFT into RBs associated with the first RAT and RBs associated with the second RAT. Some examples of the method, apparatus, and non-transitory computer-readable medium described above may further include processes, features, means, or instructions for processing the RBs associated with the second RAT by applying a respective complex phase compensation value to each tone output.

In some examples of the method, apparatus, and non-transitory computer-readable medium described above, decoding the signals of the first RAT and the signals of the second RAT comprises: separating the output of the second Rx FFT into RBs associated with the first RAT and RBs associated with the second RAT. Some examples of the method, apparatus, and non-transitory computer-readable medium described above may further include processes, features, means, or instructions for processing the RBs associated with the first RAT by applying a respective complex phase compensation value to each tone output.

A method of wireless communication is described. The method may include encoding signals of a first RAT and signals of a second RAT into first RBs and second RBs, respectively, identifying a first Tx DC location corresponding to the signals of the first RAT, performing a first Tx iFFT on the first RBs based on the first TX DC location, identifying a second Tx DC location corresponding to the signals of the second RAT, performing a second Tx iFFT on the second RBs based on the second Tx DC location, and transmitting a combined signal that includes the signals of the first RAT and the signals of the second RAT frequency domain multiplexed in a same subframe, based on an output of the first Tx iFFT and the second Tx iFFT.

An apparatus for wireless communication is described. The apparatus may include means for encoding signals of a first RAT and signals of a second RAT into first RBs and second RBs, respectively, means for identifying a first Tx DC location corresponding to the signals of the first RAT, means for performing a first Tx iFFT on the first RBs based on the first TX DC location, means for identifying a second Tx DC location corresponding to the signals of the second RAT, means for performing a second Tx iFFT on the second RBs based on the second Tx DC location, and means for transmitting a combined signal that includes the signals of the first RAT and the signals of the second RAT frequency domain multiplexed in a same subframe, based on an output of the first Tx iFFT and the second Tx iFFT.

Another apparatus for wireless communication is described. The apparatus may include a processor, memory in electronic communication with the processor, and instructions stored in the memory. The instructions may be operable to cause the processor to encode signals of a first RAT and signals of a second RAT into first RBs and second RBs, respectively, identify a first Tx DC location corresponding to the signals of the first RAT, perform a first Tx iFFT on the first RBs based on the first TX DC location, identify a second Tx DC location corresponding to the signals of the second RAT, perform a second Tx iFFT on the second RBs based on the second Tx DC location, and transmit a combined signal that includes the signals of the first RAT and the signals of the second RAT frequency domain multiplexed in a same subframe, based on an output of the first Tx iFFT and the second Tx iFFT.

A non-transitory computer readable medium for wireless communication is described. The non-transitory computer-readable medium may include instructions operable to cause a processor to encode signals of a first RAT and signals of a second RAT into first RBs and second RBs, respectively, identify a first Tx DC location corresponding to the signals of the first RAT, perform a first Tx iFFT on the first RBs based on the first TX DC location, identify a second Tx DC location corresponding to the signals of the second RAT, perform a second Tx iFFT on the second RBs based on the second Tx DC location, and transmit a combined signal that includes the signals of the first RAT and the signals of the second RAT frequency domain multiplexed in a same subframe, based on an output of the first Tx iFFT and the second Tx iFFT.

In some examples of the method, apparatus, and non-transitory computer-readable medium described above, the first Tx iFFT and the second Tx iFFT may be performed by a first Tx chain and a second Tx chain, respectively, when a user equipment (UE) may be UL multiple-input multiple-output (MIMO) capable.

In some examples of the method, apparatus, and non-transitory computer-readable medium described above, the first Tx iFFT and the second Tx iFFT may be performed by a first Tx chain and a second Tx chain, respectively, when the UE may be UL MIMO capable or intraband non-contiguous carrier aggregation (CA) capable.

In some examples of the method, apparatus, and non-transitory computer-readable medium described above, the first Tx chain and the second Tx chain may be independent of each other and each may have separate power amplifiers (PAs).

DETAILED DESCRIPTION

Techniques are described herein for addressing tone misalignment between signals of a first radio access technology (RAT) and signals of a second RAT in a combined signal. In some wireless communications systems, the tones of uplink (UL) signals may be shifted up or down based on the configuration of the particular RAT. If UL signals of the first RAT are not shifted in frequency and UL signals of the second RAT are shifted in frequency, processing the combined signal may include additional processing to account for the mismatch.

Aspects of the disclosure are initially described in the context of a wireless communications system. Aspects of the disclosure are further illustrated by and described with reference to apparatus diagrams, system diagrams, and flowcharts that relate to techniques for carrier sharing between radio access technologies.

Figure 1:
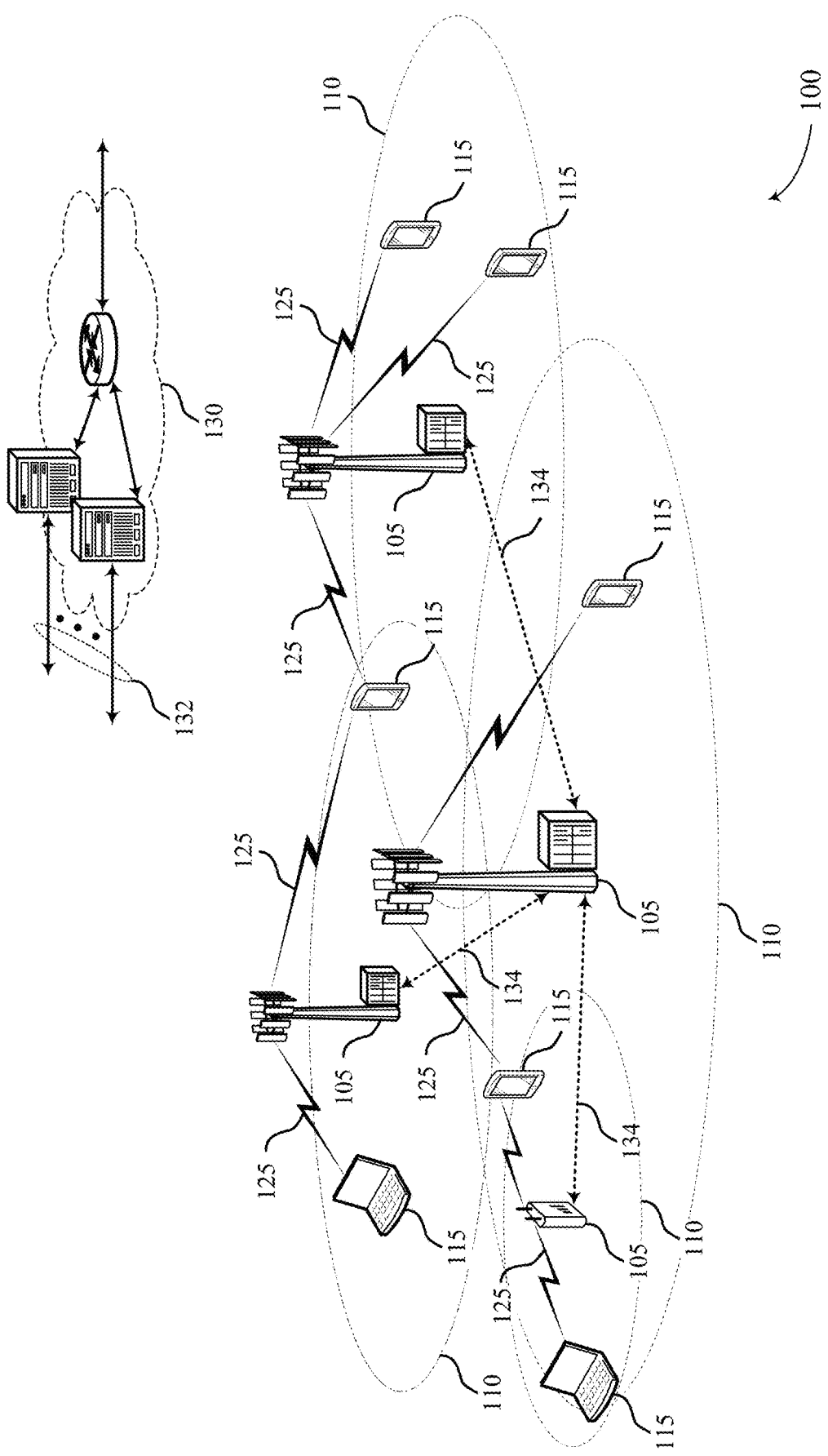
FIG. 1 illustrates an example of a system for wireless communication that supports techniques for carrier sharing between radio access technologies in accordance with aspects of the present disclosure.

FIG. 1 illustrates an example of a wireless communications system 100 in accordance with various aspects of the present disclosure. The wireless communications system 100 includes base stations 105, user equipments (UEs) 115, and a core network 130. In some examples, the wireless communications system 100 may be a Long Term Evolution (LTE), LTE-Advanced (LTE-A) network, or a New Radio (NR) network. In some cases, wireless communications system 100 may support enhanced broadband communications, ultra-reliable (i.e., mission critical) communications, low latency communications, and communications with low-cost and low-complexity devices.

Base stations 105 may wirelessly communicate with UEs 115 via one or more base station antennas. Each base station 105 may provide communication coverage for a respective geographic coverage area 110. Communication links 125 shown in wireless communications system 100 may include UL transmissions from a UE 115 to a base station 105, or downlink (DL) transmissions, from a base station 105 to a UE 115. Control information and data may be multiplexed on an UL channel or DL according to various techniques. Control information and data may be multiplexed on a DL channel, for example, using time division multiplexing (TDM) techniques, frequency division multiplexing (FDM) techniques, or hybrid TDM-FDM techniques. In some examples, the control information transmitted during a transmission time interval (TTI) of a DL channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 130 may provide user authentication, access authorization, tracking, Internet Protocol (IP) connectivity, and other access, routing, or mobility functions. At least some of the network devices, such as base station may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate in an ultra-high frequency (UHF) frequency region using frequency bands from 700 MHz to 2600 MHz (2.6 GHz), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and a first network device, a second network device, or core network 130 supporting radio bearers for user plane data. At the Physical (PHY) layer, transport channels may be mapped to physical channels.

Time intervals in LTE or NR may be expressed in multiples of a basic time unit (which may be a sampling period of $T_s=1/30{,}720{,}000$ seconds). Time resources may be organized according to radio frames of length of 10 ms ($T_f=307200\ T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

A resource element may consist of one symbol period and one subcarrier (e.g., a 15 KHz frequency range). A resource block (RB) may contain 12 consecutive subcarriers in the frequency domain and, for a normal cyclic prefix in each orthogonal frequency-division multiplexing (OFDM) symbol, 7 consecutive OFDM symbols in the time domain (1 slot), or 84 resource elements. The number of bits carried by each resource element may depend on the modulation scheme (the configuration of symbols that may be selected during each symbol period). Thus, the more RBs that a UE receives and the higher the modulation scheme, the higher the data rate may be.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple DL CCs and one or more UL CCs for carrier aggregation. Carrier aggregation may be used with both frequency division duplexing (FDD) and time division duplexing (TDD) component carriers.

In some cases, wireless communications system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link).

An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless communications system 100 may utilize both licensed and unlicensed radio frequency spectrum bands. For example, wireless communications system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include DL transmissions, UL transmissions, or both. Duplexing in unlicensed spectrum may be based on FDD, TDD or a combination of both.

Figure 2:
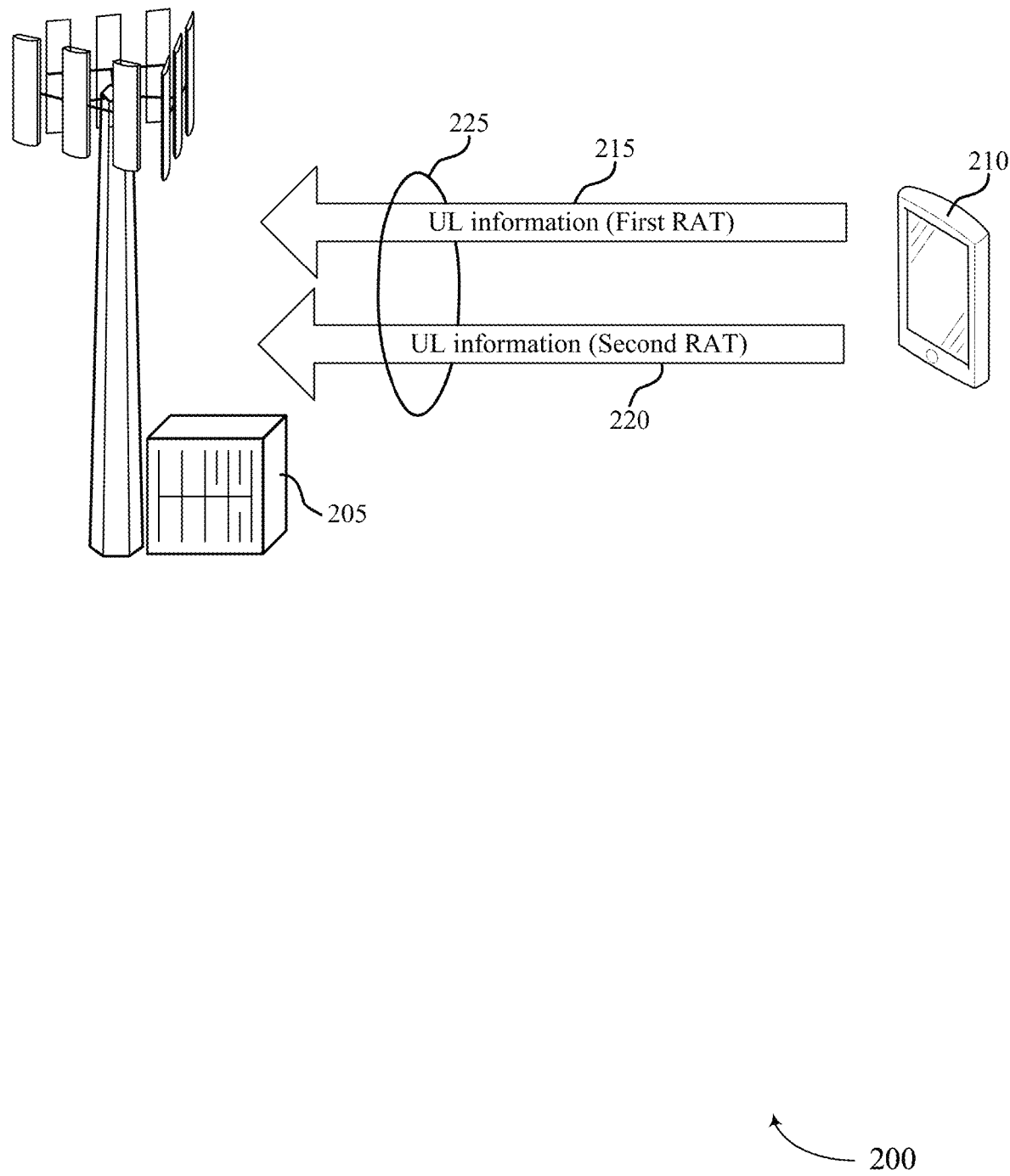
FIG. 2 illustrates an example of a wireless communications system that supports techniques for carrier sharing between radio access technologies in accordance with aspects of the present disclosure.

FIG. 2 illustrates an example of a wireless communications system 200 that supports techniques for carrier sharing between radio access technologies in accordance with various aspects of the present disclosure. In some examples, the wireless communications system 200 may implement aspects of wireless communications system 100. The wireless communications system 200 illustrates communications between a base station 205 and a UE 210. The base station 205 may be an example of the base stations 105 described with reference to FIG. 1. The UE 210 may be an example of the UEs 115 described with reference to FIG. 1.

In wireless communications system 200, the base station 205 and the UE 210 may communicate using multiple RATs on the same carrier. For example, the base station 205 and the UE 210 may communicate using both NR signals and LTE signals on the same carrier. In some cases, this may be referred to as DL sharing or UL sharing. The carrier sharing may include sharing both from the network's perspective and the UE's perspective. The carrier sharing may be include sharing only from the network's perspective. The first RAT and the second RAT may be any type of RAT. For example, the RATs may be NR, LTE, 3G, Wi-Fi, Wi-Max, other standards related to Institute of Electrical and Electronics Engineers (IEEE) 802.11, or various combinations thereof.

Sometimes various characteristics of the first RAT and the second RAT may complicate encoding and decoding procedures for a carrier that includes signals from both RATs. For example, if a carrier (e.g., a subframe) includes information associated with NR and information associated with LTE, there may be a mismatch between of tones in the UL. Techniques are described herein for addressing tone misalignment between NR and LTE in the UL context. As such, the wireless communications system 200 illustrates UL signals 215 using a first RAT and UL signals 220 using a second RAT. These UL signals 215 and 220 may be bundled into the same PHY layer resource (e.g., subframe, carrier, etc.). The bundling may form a combined signal 225 that includes both signals 215 and signals 220. In some examples, the signals 215 and the signals 220 are frequency division multiplexed to form the combined signal 225. In some examples, the signals 215 and the signals 220 may use different RBs. It should be appreciated that the techniques described herein may be adapted to be applied in a DL context as well.

The tone frequency mismatch between NR and LTE may be based on specific features of those RATs. In LTE, UL signals have an even number subcarriers (e.g., two subcarriers). Consequently, in LTE, the UL may be shifted (either up or down) in frequency by half the subcarrier spacing such that the subcarriers are symmetric about DC, causing less bandwidth to be wasted. In NR, no such frequency shifting is applied UL signals. Consequently, when a combined UL signal includes signals from both NR and LTE, a DC value of the LTE signals may be offset from a DC value of the NR signals (as shown in FIG. 3).

Figure 3:
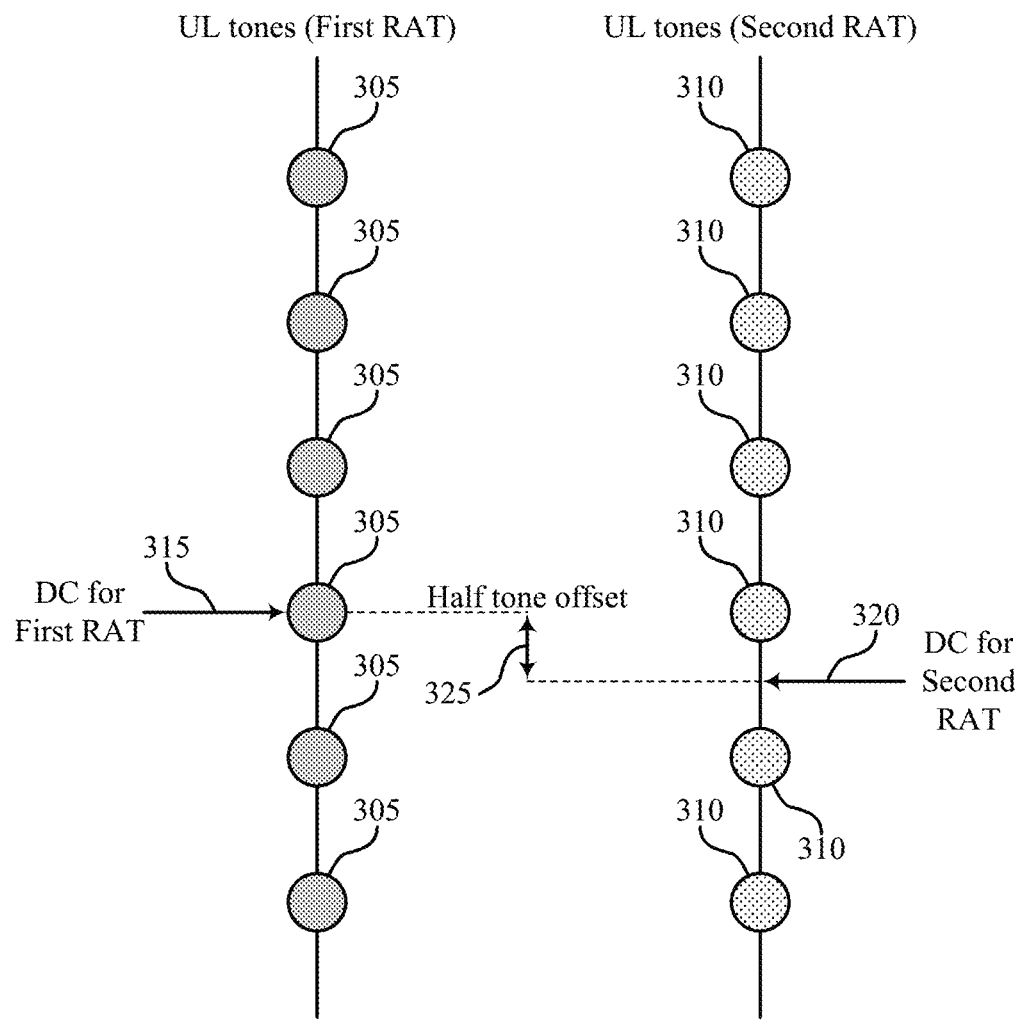
FIG. 3 illustrates an example of a tone chart that supports techniques for carrier sharing between radio access technologies in accordance with aspects of the present disclosure.

FIG. 3 illustrates an example of a tone chart 300 that supports techniques for carrier sharing between radio access technologies in accordance with various aspects of the present disclosure. In some examples, tone chart 300 may implement aspects of wireless communications systems 100 or 200. The tone chart 300 shows UL tones 305 for a first RAT (e.g., NR) and UL tones 310 for a second RAT (e.g., LTE). A DC value 315 for the UL tones 305 may be offset from a DC value 320 for the UL tones 310 based on frequency shifting done by the second RAT. The DC values 315 and 320 may be separated by an offset 325. In some examples, the offset 325 may be a half tone offset. In some examples, the offset 325 may be equal to one-half of a subcarrier spacing of the second RAT (e.g., LTE). In some examples, the offset 325 may be equal to one-half of subcarrier spacing of the first RAT (e.g., NR).

Returning to FIG. 2, in some cases of UL sharing, the different signal definitions of NR and LTE may introduce processing misalignment of tones between NR and LTE in the combined signal 225. While a second RAT (e.g., LTE) uses a half-tone shift in UL signals, a first RAT (e.g., NR) may not. In order to achieve tone alignment between the first RAT and the second RAT (e.g., NR and LTE), a possible option is to use a 7.5 kHz NR UL raster shift. Another option may be to use baseband half-tone shift for NR.

Regarding a radio frequency (RF) shift implementation choice (i.e. NR DC is tone aligned but the UL raster is shifted by 7.5 kHz), the base station 205 may receive a mix of first RAT signals 215 and second RAT signals 220 FDM'd in the same subframe (e.g., the combined signal 225). In such an implementation, there may be two DC locations in the combined signal 225, 7.5 kHz apart. The base station 205 may be configured to mitigate both UE Tx locations. In terms of possible base station 205 receiver implementations, the base station 205 may choose to align the Rx DC with either the first RAT DC location or the second RAT DC location. In some examples, the subcarrier spacing for both the first RAT and the second RAT may be 15 kHz. In some examples, the subcarrier spacing for NR is 15 kHz.

Techniques are described herein for addressing processing issues that may arise for the offset between DC values of the UL tones of the different RATs. In some examples, some techniques may include using a single common Fast Fourier Transform (FFT) and/or inverse FFT (iFFT) to process the combined signal 225. In some examples, multiple FFTs and/or iFFTs may be used to process the combined signal 225. In some examples, different transmission/receive chains may be used to communicate the first RAT signals 215 and the second RAT signals 220.

Regarding the transmission/receive chain example, one of the RATs (e.g., the first RAT) may be configured to transmit both signals 215 and 220. For example, if the UE 210 is configured to transmit UL signals using MIMO for the first RAT (e.g., NR), one of the UL chains of the UE 210 may be converted for use by the second RAT (e.g., LTE). In some examples, if the UE 210 is configured to transmit UL signals using intraband non-contiguous carrier aggregation for the first RAT (e.g., NR), one of the UL chains of the UE 210 may be converted for use by the second RAT (e.g., LTE). In such examples, intermodulation products caused by transmission non-linearities may be reduced if two independent transmission chains with independent power amplifiers are utilized.

Figure 4:
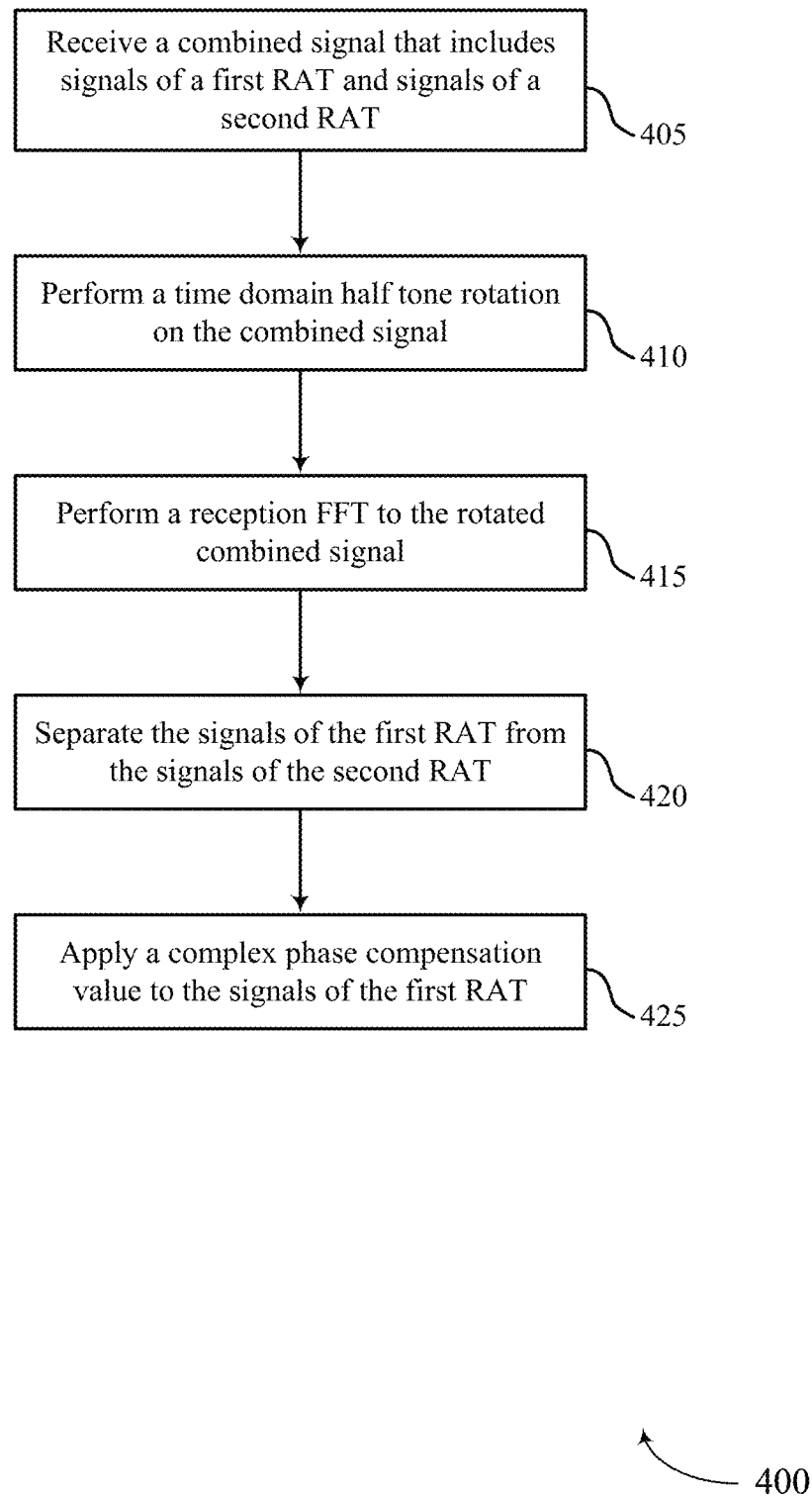
FIG. 4 illustrates an example of a flow chart that supports techniques for carrier sharing between radio access technologies in accordance with aspects of the present disclosure.

FIG. 4 shows a flowchart illustrating a method 400 for techniques for carrier sharing between radio access technologies in accordance with aspects of the present disclosure. The operations of method 400 may be implemented by a base station 105 or 205 or its components as described herein. For example, the operations of method 400 may be performed by a base station communications manager as described with reference to FIGS. 12 through 15. In some examples, a base station 105, 205 may execute a set of codes to control the functional elements of the device to perform the functions described below. Additionally or alternatively, the base station 105, 205 may perform aspects of the functions described below using special-purpose hardware.

The method 400 illustrates an example where the base station 105 aligns reception DC values with a DC location of the second RAT (e.g., LTE). The method 400 assumes that the UL signal 215 of the first RAT is not shifted (e.g., NR) and the UL signal 220 of the second RAT is shifted (e.g., LTE). In the method 400, the base station 105 may shift the combined signal 215 in the time-domain before separating the signals 215 and 220. As such, additional processing may be applied to first RAT signal 215 in the frequency domain to undo the shift applied in the time domain to the combined signal 215.

At block 405 the base station 105 receive a combined signal that includes signals of a first RAT and signals of a second RAT. The combined signal may be an example of combined signal 215 described with reference to FIG. 2. The operations of block 405 may be performed according to the methods described herein. In certain examples, aspects of the operations of block 405 may be performed by a receiver as described with reference to FIGS. 12 through 15.

At block 410 the base station 105 may perform a time domain half tone rotation. For example, if the FFT size is 2048, then the 2048 time domain samples may be multiplied with complex values that realize a 0 to pi ($\exp\{j(n*pi/2048)\}$, where n is the sample index) rotation. At this point, the signals of the first RAT (e.g., NR) and the signals of the second RAT (e.g., LTE) are not separated, so the half-tone rotation is applied to both. The functions of block 410 may occur before performing a reception FFT on the combined signal. The operations of block 410 may be performed according to the methods described herein. In certain examples, aspects of the operations of block 410 may be performed by a receiver as described with reference to FIGS. 12 through 15.

At block 415 the base station 105 may perform a reception FFT on the rotated combined signal. The operations of block 415 may be performed according to the methods described herein. In certain examples, aspects of the operations of block 415 may be performed by a receiver as described with reference to FIGS. 12 through 15.

At block 420 the base station 105 may separate the signals of the first RAT from the signals of the second RAT. For the signals of the second RAT, the downstream processing may proceed as normal. The operations of block 420 may be performed according to the methods described herein. In certain examples, aspects of the operations of block 420 may be performed by a receiver as described with reference to FIGS. 12 through 15.

At block 425 the base station 105 may apply a complex phase compensation value to the signals of the first RAT. Such an action may undo the shift caused by rotating the combined signal in the time domain. In some examples, each tone of the signals of the first RAT may be multiplied by a single complex phase compensation value. The phase compensation value may be dependent on a symbol index, a cyclic prefix, a length of a cyclic prefix (e.g., normal CP or extended CP), or a type of cyclic prefix, or a combination thereof. The compensation values may be determined from a look up table or computed dynamically by the base station 105. Afterwards, the downstream processing for the signals of the first RAT may proceed as normal. The operations of block 425 may be performed according to the methods described herein. In certain examples, aspects of the operations of block 425 may be performed by a receiver as described with reference to FIGS. 12 through 15.

Figure 5:
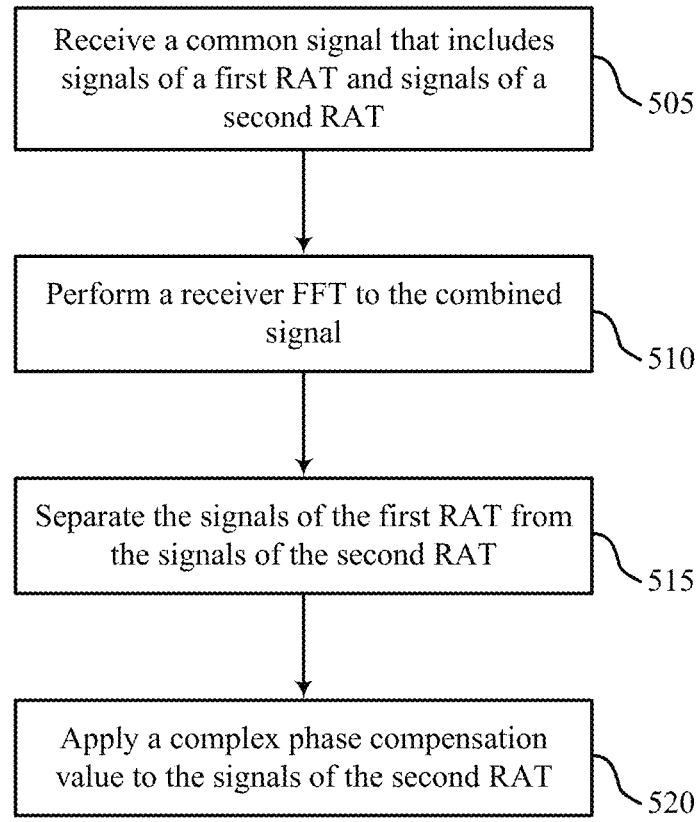
FIG. 5 illustrates an example of a flow chart that supports techniques for carrier sharing between radio access technologies in accordance with aspects of the present disclosure.

FIG. 5 shows a flowchart illustrating a method 500 for techniques for carrier sharing between radio access technologies in accordance with aspects of the present disclosure. The operations of method 500 may be implemented by a base station 105 or 205 its components as described herein. For example, the operations of method 500 may be performed by a base station communications manager as described with reference to FIGS. 12 through 15. In some examples, a base station 105, 205 may execute a set of codes to control the functional elements of the device to perform the functions described below. Additionally or alternatively, the base station 105, 205 may perform aspects of the functions described below using special-purpose hardware.

The method 500 illustrates an example where the base station 105 aligns reception DC values with a DC location of the first RAT (e.g., NR). The method 500 assumes that the UL signal 215 of the first RAT is not shifted (e.g., NR) and the UL signal 220 of the second RAT is shifted (e.g., LTE). In the method 500, additional processing may be applied to second RAT signal 215 in the frequency domain to compensate for the shift. In the method 500, the base station 105 may not perform a time domain half tone rotation before applying the FFT to the combined signal.

At block 505 the base station 105 receive a combined signal that includes signals of a first RAT and signals of a second RAT. The combined signal may be an example of combined signal 215 described with reference to FIG. 2. The operations of block 505 may be performed according to the methods described herein. In certain examples, aspects of the operations of block 505 may be performed by a receiver as described with reference to FIGS. 12 through 15.

At block 510 the base station 105 may perform a reception FFT on the combined signal received from another network device. The operations of block 510 may be performed according to the methods described herein. In certain examples, aspects of the operations of block 510 may be performed by a receiver as described with reference to FIGS. 12 through 15.

At block 515 the base station 105 may separate the signals of the first RAT from the signals of the second RAT. For the signals of the first RAT, the downstream processing may proceed as normal. The operations of block 515 may be performed according to the methods described herein. In certain examples, aspects of the operations of block 515 may be performed by a receiver as described with reference to FIGS. 12 through 15.

At block 520 the base station 105 may apply a complex phase compensation value to the signals of the second RAT. Such an action may undo the shift implemented at the transmitter of the combined signal (e.g., half a subcarrier spacing shift done in LTE). In some examples, each tone of the signals of the second RAT may be multiplied by a single complex phase compensation value. The phase compensation value may be dependent on a symbol index, a cyclic prefix, a length of a cyclic prefix (e.g., normal CP or extended CP), a type of cyclic prefix, or a combination thereof. The compensation values may be determined from a look up table or computed dynamically by the base station 105. Afterwards, the downstream processing for the signals of the second RAT may proceed as normal. In some examples, the phase compensation value is the conjugate of the phase compensation value described in method 400. The operations of block 520 may be performed according to the methods described herein. In certain examples, aspects of the operations of block 520 may be performed by a receiver as described with reference to FIGS. 12 through 15.

Figure 6:
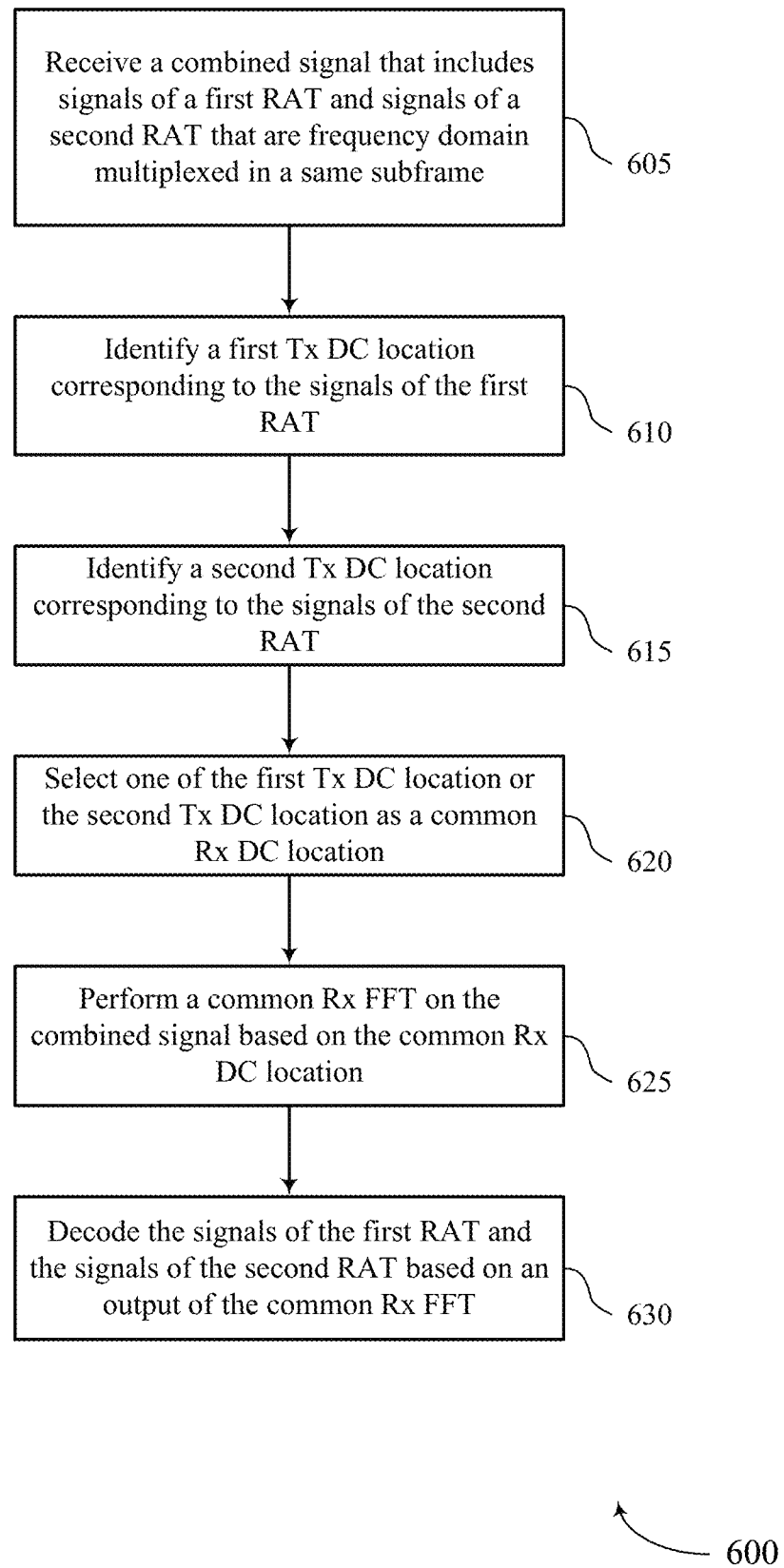
FIG. 6 illustrates an example of a flow chart that supports techniques for carrier sharing between radio access technologies in accordance with aspects of the present disclosure.

FIG. 6 shows a flowchart illustrating a method 600 for techniques for carrier sharing between radio access technologies in accordance with aspects of the present disclosure. The operations of method 600 may be implemented by a base station 105 or 205 or its components as described herein. For example, the operations of method 600 may be performed by a base station communications manager as described with reference to FIGS. 12 through 15. In some examples, a base station 105, 205 may execute a set of codes to control the functional elements of the device to perform the functions described below. Additionally or alternatively, the base station 105, 205 may perform aspects of the functions described below using special-purpose hardware.

At block 605 the base station 105 may receive a combined signal that includes signals of a first RAT and signals of a second RAT that are frequency domain multiplexed in a same subframe. The operations of block 605 may be performed according to the methods described herein. In certain examples, aspects of the operations of block 605 may be performed by a receiver as described with reference to FIGS. 12 through 15.

At block 610 the base station 105 may identify a first transmit (Tx) direct current (DC) location corresponding to the signals of the first RAT. The operations of block 610 may be performed according to the methods described herein. In certain examples, aspects of the operations of block 610 may be performed by a DC manager as described with reference to FIGS. 12 through 15.

At block 615 the base station 105 may identify a second Tx DC location corresponding to the signals of the second RAT. The operations of block 615 may be performed according to the methods described herein. In certain examples, aspects of the operations of block 615 may be performed by a DC manager as described with reference to FIGS. 12 through 15.

At block 620 the base station 105 may select one of the first Tx DC location or the second Tx DC location as a common Rx DC location. The operations of block 620 may be performed according to the methods described herein. In certain examples, aspects of the operations of block 620 may be performed by a location manager as described with reference to FIGS. 12 through 15.

At block 625 the base station 105 may perform a common Rx FFT on the combined signal based on the common Rx DC location. The operations of block 625 may be performed according to the methods described herein. In certain examples, aspects of the operations of block 625 may be performed by a FFT manager as described with reference to FIGS. 12 through 15.

At block 630 the base station 105 may decode the signals of the first RAT and the signals of the second RAT based on an output of the common Rx FFT. The operations of block 630 may be performed according to the methods described herein. In certain examples, aspects of the operations of block 630 may be performed by a decoding manager as described with reference to FIGS. 12 through 15.

Figure 7:
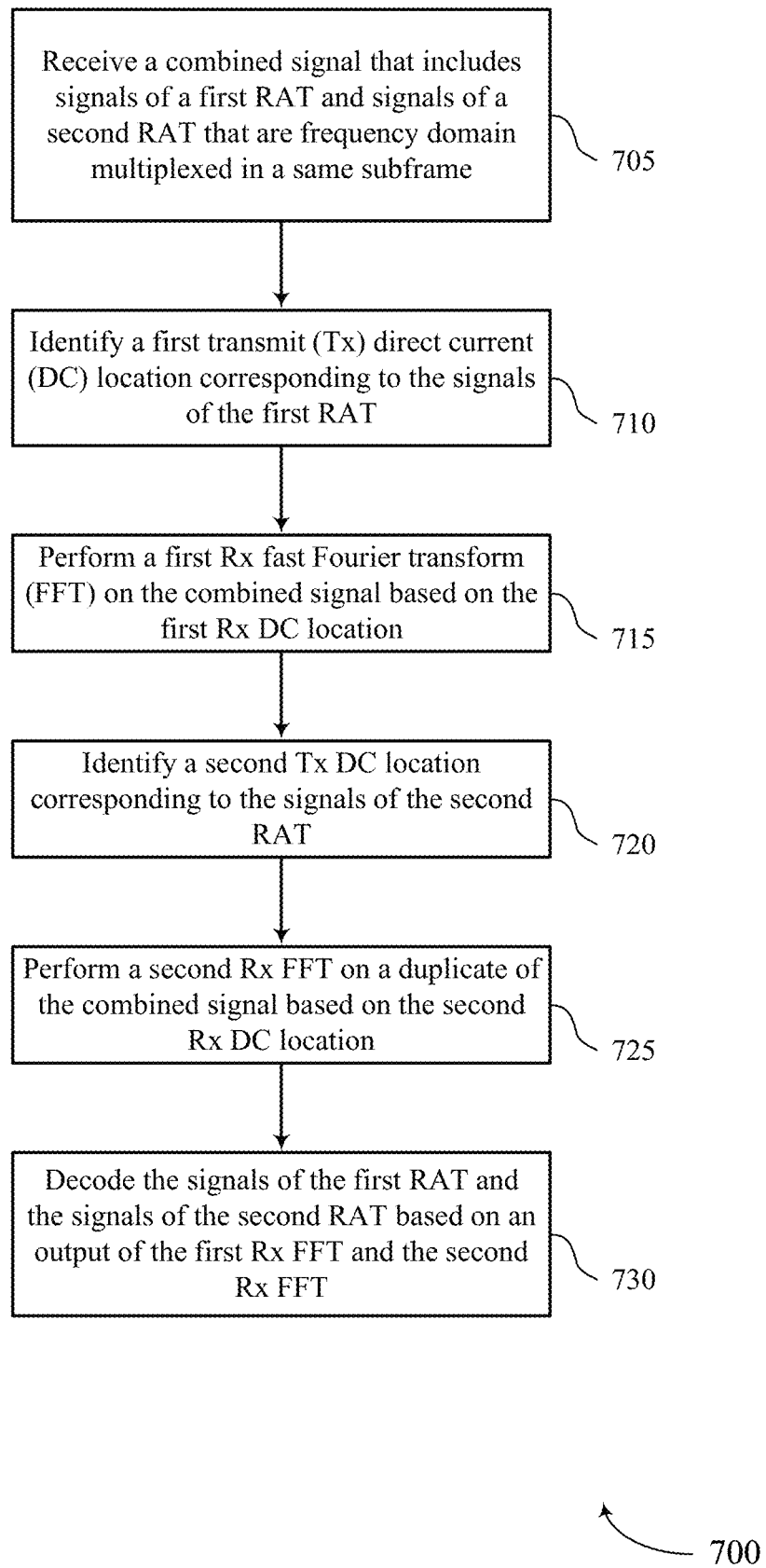
FIG. 7 illustrates an example of a flow chart that supports techniques for carrier sharing between radio access technologies in accordance with aspects of the present disclosure.

FIG. 7 shows a flowchart illustrating a method 700 for techniques for carrier sharing between radio access technologies in accordance with aspects of the present disclosure. The operations of method 700 may be implemented by a base station 105 or 205 or its components as described herein. For example, the operations of method 700 may be performed by a base station communications manager as described with reference to FIGS. 12 through 15. In some examples, a base station 105, 205 may execute a set of codes to control the functional elements of the device to perform the functions described below. Additionally or alternatively, the base station 105, 205 may perform aspects of the functions described below using special-purpose hardware.

The method 700 illustrates an example where the base station 105 may be configured to use two receive chains with two FFTs to decode the first RAT signals in the combined signal and the second RAT signals in the combined signal. For example, a first reception chain may be dedicated to signals of the first RAT (e.g., NR) and a second receive chain may be dedicated to signals of the second RAT (e.g., LTE). In the receive chain for the first RAT, after applying a first FFT associated with the first RAT, the base station 105 may extract the first RAT RBs and discard the content in second RAT RBs. In the receive chain for the second RAT, after applying a second FFT associated with the second RAT, the base station 105 may extract the second RAT RBs and discard the content in first RAT RBs. By doing the above, the base station 105 may separate the first RAT signals from the second RAT signals. After the signals are separated, they go through downstream operations defined for their respective RATs separately.

In some multi user (MU) MIMO examples where a NR signal and a LTE signal are on top of each other on the same RB, using two receive chains as described above may not separate the two signals because they are coupled in RB domain. In such examples, single FFT solutions may be used to separate the signals.

At block 705 the base station 105 may receive a combined signal that includes signals of a first RAT and signals of a second RAT that are frequency domain multiplexed in a same subframe. The operations of block 705 may be performed according to the methods described herein. In certain examples, aspects of the operations of block 705 may be performed by a receiver as described with reference to FIGS. 12 through 15.

At block 710 the base station 105 may identify a first Tx DC location corresponding to the signals of the first RAT. The operations of block 710 may be performed according to the methods described herein. In certain examples, aspects of the operations of block 710 may be performed by a location manager as described with reference to FIGS. 12 through 15.

At block 715 the base station 105 may perform a first Rx FFT on the combined signal based on the first Rx DC location. The operations of block 715 may be performed according to the methods described herein. In certain examples, aspects of the operations of block 715 may be performed by a FFT manager as described with reference to FIGS. 12 through 15.

At block 720 the base station 105 may identify a second Tx DC location corresponding to the signals of the second RAT. The operations of block 720 may be performed according to the methods described herein. In certain examples, aspects of the operations of block 720 may be performed by a location manager as described with reference to FIGS. 12 through 15.

At block 725 the base station 105 may perform a second Rx FFT on a duplicate of the combined signal based on the second Rx DC location. The operations of block 725 may be performed according to the methods described herein. In certain examples, aspects of the operations of block 725 may be performed by a FFT manager as described with reference to FIGS. 12 through 15.

At block 730 the base station 105 may decode the signals of the first RAT and the signals of the second RAT based on an output of the first Rx FFT and the second Rx FFT. The operations of block 730 may be performed according to the methods described herein. In certain examples, aspects of the operations of block 730 may be performed by a decoding manager as described with reference to FIGS. 12 through 15.

Figure 8:
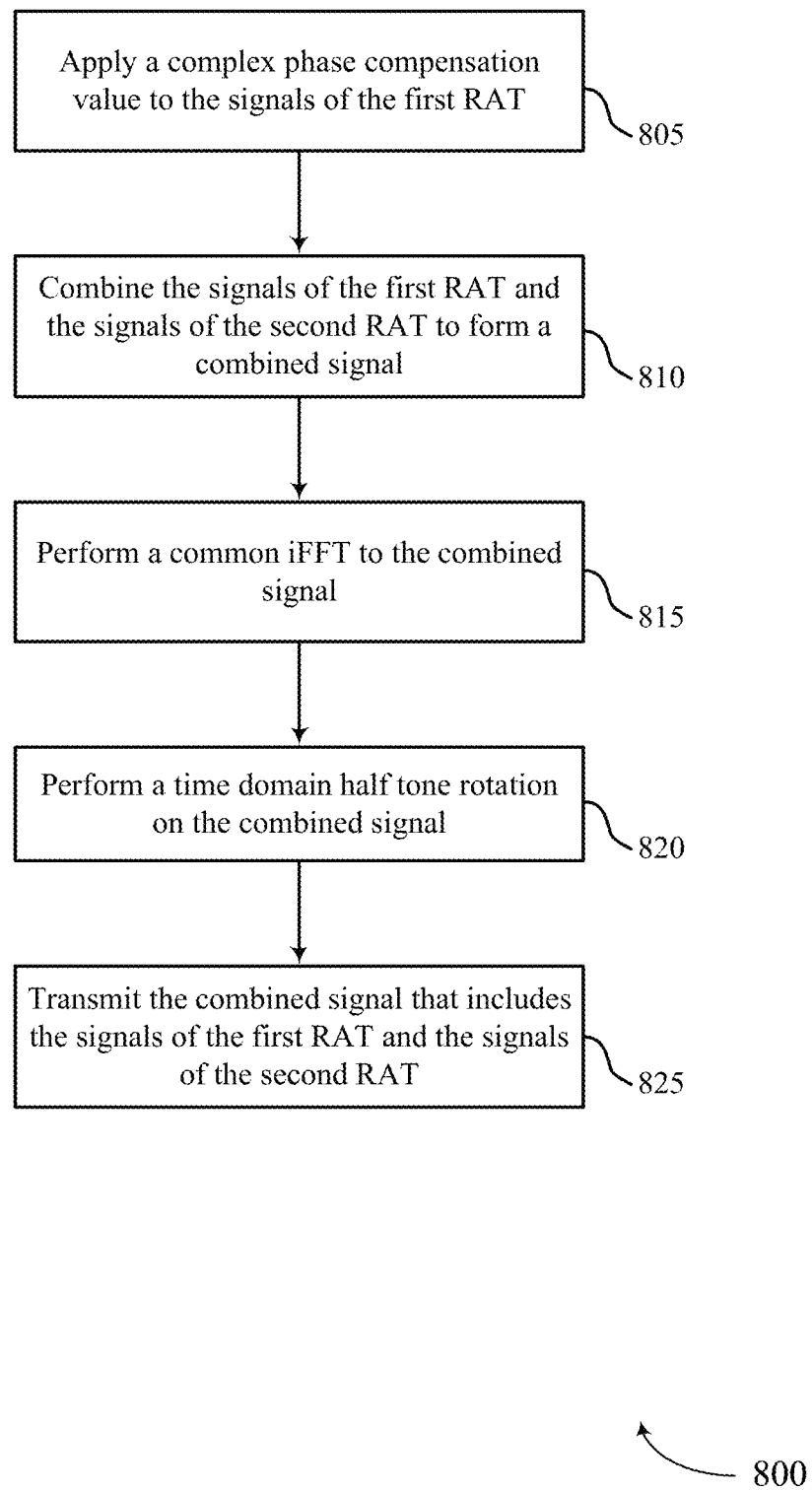
FIG. 8 illustrates an example of a flow chart that supports techniques for carrier sharing between radio access technologies in accordance with aspects of the present disclosure.

FIG. 8 shows a flowchart illustrating a method 800 for techniques for carrier sharing between radio access technologies in accordance with aspects of the present disclosure. The operations of method 800 may be implemented by a UE 115 or 210 or its components as described herein. For example, the operations of method 800 may be performed by a UE communications manager as described with reference to FIGS. 16 through 19. In some examples, a UE 115, 210 may execute a set of codes to control the functional elements of the device to perform the functions described below. Additionally or alternatively, the UE 115, 210 may perform aspects of the functions described below using special-purpose hardware.

The method 800 illustrates an example where the UE 115 aligns transmission DC values with a DC location of the second RAT (e.g., LTE). The method 800 assumes that the UL signal 215 of the first RAT is not shifted (e.g., NR) and the UL signal 220 of the second RAT is shifted (e.g., LTE). In the method 800, the UE 115 may perform some pre-processing on the UL signal of the first RAT before applying a common iFFT associated with the second RAT to the combined signal. The pre-processing may be applied to the first RAT signal 215 in the frequency domain to account for applying a common iFFT that takes into account the tone shift of the second RAT.

At block 805 the UE 115 may apply a complex phase compensation value to the signals of the first RAT. In some examples, each tone of the signals of the first RAT may be multiplied by a single complex phase compensation value. The phase compensation value may be dependent on a symbol index, a cyclic prefix, a length of a cyclic prefix (e.g., normal CP or extended CP), a type of cyclic prefix, or a combination thereof. The compensation values may be determined from a look up table or computed dynamically by the UE 115. Afterwards, the downstream processing for the signals of the first RAT may proceed as normal. The operations of block 805 may be performed according to the methods described herein. In certain examples, aspects of the operations of block 805 may be performed by a encoding manager as described with reference to FIGS. 16 through 19.

At block 810 the UE 115 may combine the signals of the first RAT and the signals of the second RAT to form a combined signal. The operations of block 810 may be performed according to the methods described herein. In certain examples, aspects of the operations of block 810 may be performed by a encoding manager as described with reference to FIGS. 16 through 19.

At block 815 the UE 115 may perform a common iFFT to the signals of the first RAT and the signals of the second RAT. In some examples, the common iFFT may be applied after the compensation value is applied to the signals of the first RAT. The operations of block 815 may be performed according to the methods described herein. In certain examples, aspects of the operations of block 815 may be performed by a encoding manager as described with reference to FIGS. 16 through 19.

At block 820 the UE 115 may perform a time domain half tone rotation on the combined signal. For example, if the FFT size is 2048, then the 2048 time domain samples may be multiplied with complex values that realize a 0 to pi $(\exp\{j(n*pi/2048)\}$, where n is the sample index) rotation. At this point, the signals of the first RAT (e.g., NR) and the signals of the second RAT (e.g., LTE) are not separated, so the half-tone rotation is applied to both. The functions of block 820 may occur after performing a common iFFT on the combined signal. The operations of block 820 may be performed according to the methods described herein. In certain examples, aspects of the operations of block 820 may be performed by a encoding manager as described with reference to FIGS. 16 through 19.

At block 825 the UE 115 may transmit the combined signal that includes the signals of the first RAT and the signals of the second RAT. The combined signal may be an example of combined signal 215 described with reference to FIG. 2. The operations of block 825 may be performed according to the methods described herein. In certain examples, aspects of the operations of block 825 may be performed by a encoding manager as described with reference to FIGS. 16 through 19.

Figure 9:
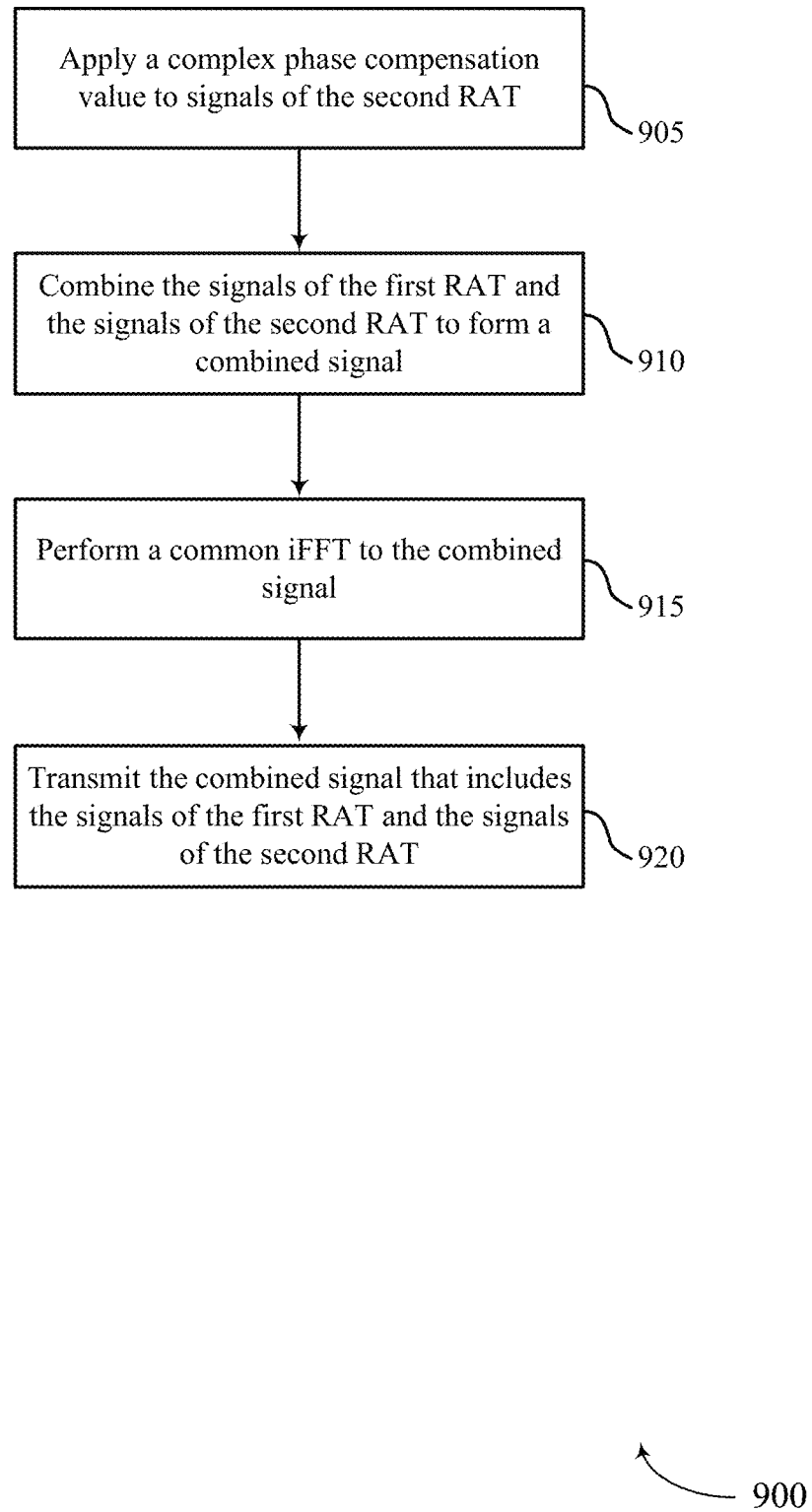
FIG. 9 illustrates an example of a flow chart that supports techniques for carrier sharing between radio access technologies in accordance with aspects of the present disclosure.

FIG. 9 shows a flowchart illustrating a method 900 for techniques for carrier sharing between radio access technologies in accordance with aspects of the present disclosure. The operations of method 900 may be implemented by a UE 115 or 210 or its components as described herein. For example, the operations of method 900 may be performed by a UE communications manager as described with reference to FIGS. 16 through 19. In some examples, a UE 115, 210 may execute a set of codes to control the functional elements of the device to perform the functions described below. Additionally or alternatively, the UE 115, 210 may perform aspects of the functions described below using special-purpose hardware.

The method 900 illustrates an example where the UE 115 aligns transmission DC values with a DC location of the first RAT (e.g., NR). The method 900 assumes that the UL signal 215 of the first RAT is not shifted (e.g., NR) and the UL signal 220 of the second RAT is shifted (e.g., LTE). In the method 900, the UE 115 may perform some pre-processing on the UL signal of the second RAT before applying a common iFFT associated with the first RAT to the combined signal. The pre-processing may be applied to the second RAT signal 220 in the frequency domain to account for applying a common iFFT that is associated with the first RAT and does not take into account any tone shift in the second RAT.

At block 905 the UE 115 may apply a complex phase compensation value to the signals of the second RAT. In some examples, each tone of the signals of the second RAT may be multiplied by a single complex phase compensation value. The phase compensation value may be dependent on a symbol index, a cyclic prefix, a length of a cyclic prefix (e.g., normal CP or extended CP), a type of cyclic prefix, or a combination thereof. The compensation values may be determined from a look up table or computed dynamically by the UE 115. Afterwards, the downstream processing for the signals of the second RAT may proceed as normal. In some examples, the phase compensation value is the conjugate of the phase compensation value described in method 800. The operations of block 905 may be performed according to the methods described herein. In certain examples, aspects of the operations of block 905 may be performed by a encoding manager as described with reference to FIGS. 16 through 19.

At block 910 the UE 115 may combine the signals of the first RAT and the signals of the second RAT to form a combined signal. The operations of block 910 may be performed according to the methods described herein. In certain examples, aspects of the operations of block 910 may be performed by a encoding manager as described with reference to FIGS. 16 through 19.

At block 915 the UE 115 may perform a common iFFT to the signals of the first RAT and the signals of the second RAT. In some examples, the common iFFT may be applied after the compensation value is applied to the signals of the second RAT. The operations of block 915 may be performed according to the methods described herein. In certain examples, aspects of the operations of block 915 may be performed by a encoding manager as described with reference to FIGS. 16 through 19.

At block 920 the UE 115 may transmit the combined signal that includes the signals of the first RAT and the signals of the second RAT. The combined signal may be an example of combined signal 215 described with reference to FIG. 2. The operations of block 920 may be performed according to the methods described herein. In certain examples, aspects of the operations of block 920 may be performed by a encoding manager as described with reference to FIGS. 16 through 19.

Figure 10:
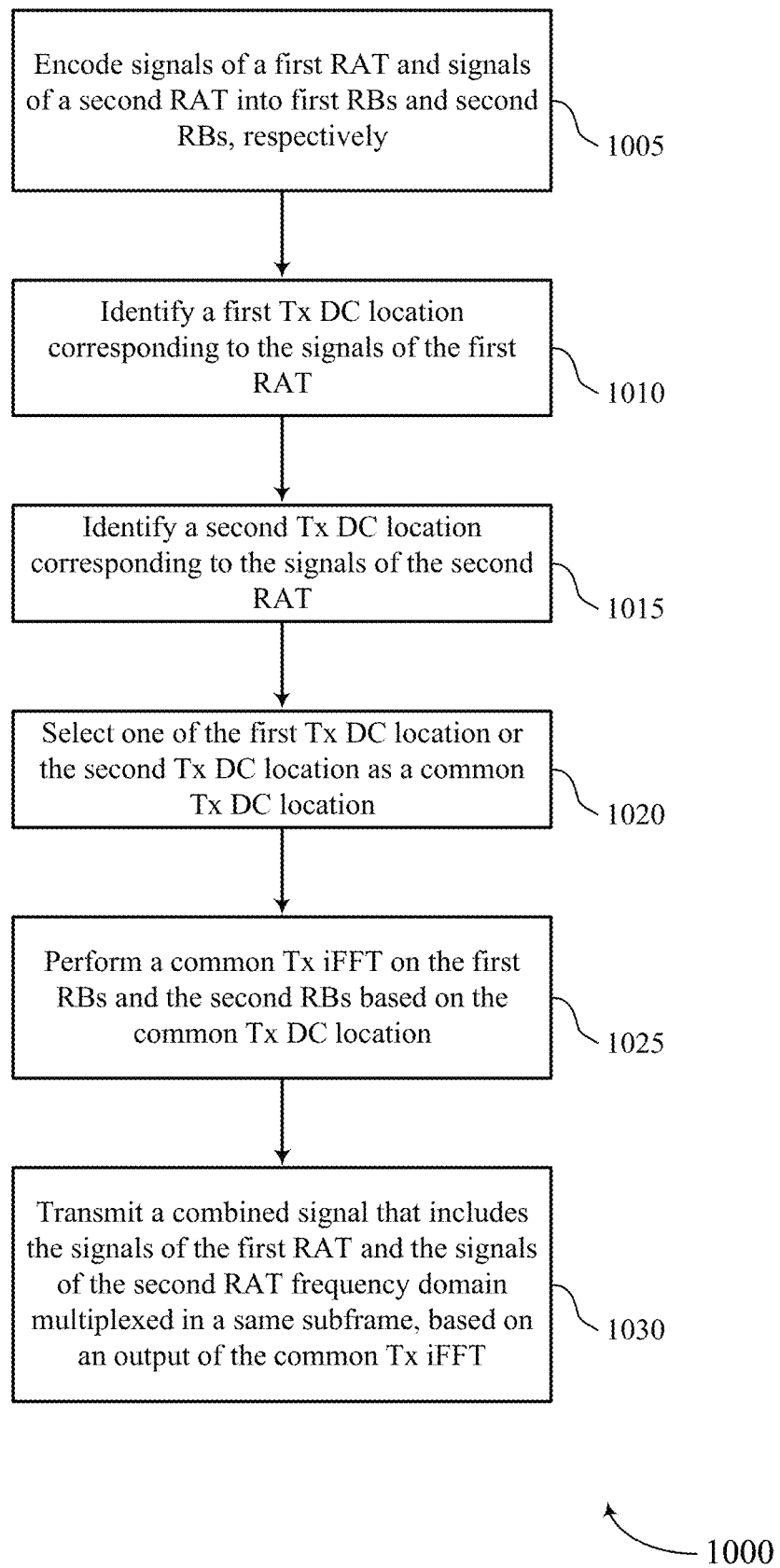
FIG. 10 illustrates an example of a flow chart that supports techniques for carrier sharing between radio access technologies in accordance with aspects of the present disclosure.

FIG. 10 shows a flowchart illustrating a method 1000 for techniques for carrier sharing between radio access technologies in accordance with aspects of the present disclosure. The operations of method 1000 may be implemented by a UE 115 or 210 or its components as described herein. For example, the operations of method 1000 may be performed by a UE communications manager as described with reference to FIGS. 16 through 19. In some examples, a UE 115, 210 may execute a set of codes to control the functional elements of the device to perform the functions described below. Additionally or alternatively, the UE 115, 210 may perform aspects of the functions described below using special-purpose hardware.

At block 1005 the UE 115 may encode signals of a first RAT and signals of a second RAT into first RBs and second RBs, respectively. The operations of block 1005 may be performed according to the methods described herein. In certain examples, aspects of the operations of block 1005 may be performed by a encoding manager as described with reference to FIGS. 16 through 19.

At block 1010 the UE 115 may identify a first Tx DC location corresponding to the signals of the first RAT. The operations of block 1010 may be performed according to the methods described herein. In certain examples, aspects of the operations of block 1010 may be performed by a DC manager as described with reference to FIGS. 16 through 19.

At block 1015 the UE 115 may identify a second Tx DC location corresponding to the signals of the second RAT. The operations of block 1015 may be performed according to the methods described herein. In certain examples, aspects of the operations of block 1015 may be performed by a DC manager as described with reference to FIGS. 16 through 19.

At block 1020 the UE 115 may select one of the first Tx DC location or the second Tx DC location as a common Tx DC location. The operations of block 1020 may be performed according to the methods described herein. In certain examples, aspects of the operations of block 1020 may be performed by a location manager as described with reference to FIGS. 16 through 19.

At block 1025 the UE 115 may perform a common Tx iFFT on the first RBs and the second RBs based on the common Tx DC location. The operations of block 1025 may be performed according to the methods described herein. In certain examples, aspects of the operations of block 1025 may be performed by a iFFT manager as described with reference to FIGS. 16 through 19.

At block 1030 the UE 115 may transmit a combined signal that includes the signals of the first RAT and the signals of the second RAT frequency domain multiplexed in a same subframe, based on an output of the common Tx iFFT. The operations of block 1030 may be performed according to the methods described herein. In certain examples, aspects of the operations of block 1030 may be performed by a transmitter as described with reference to FIGS. 16 through 19.

Figure 11:
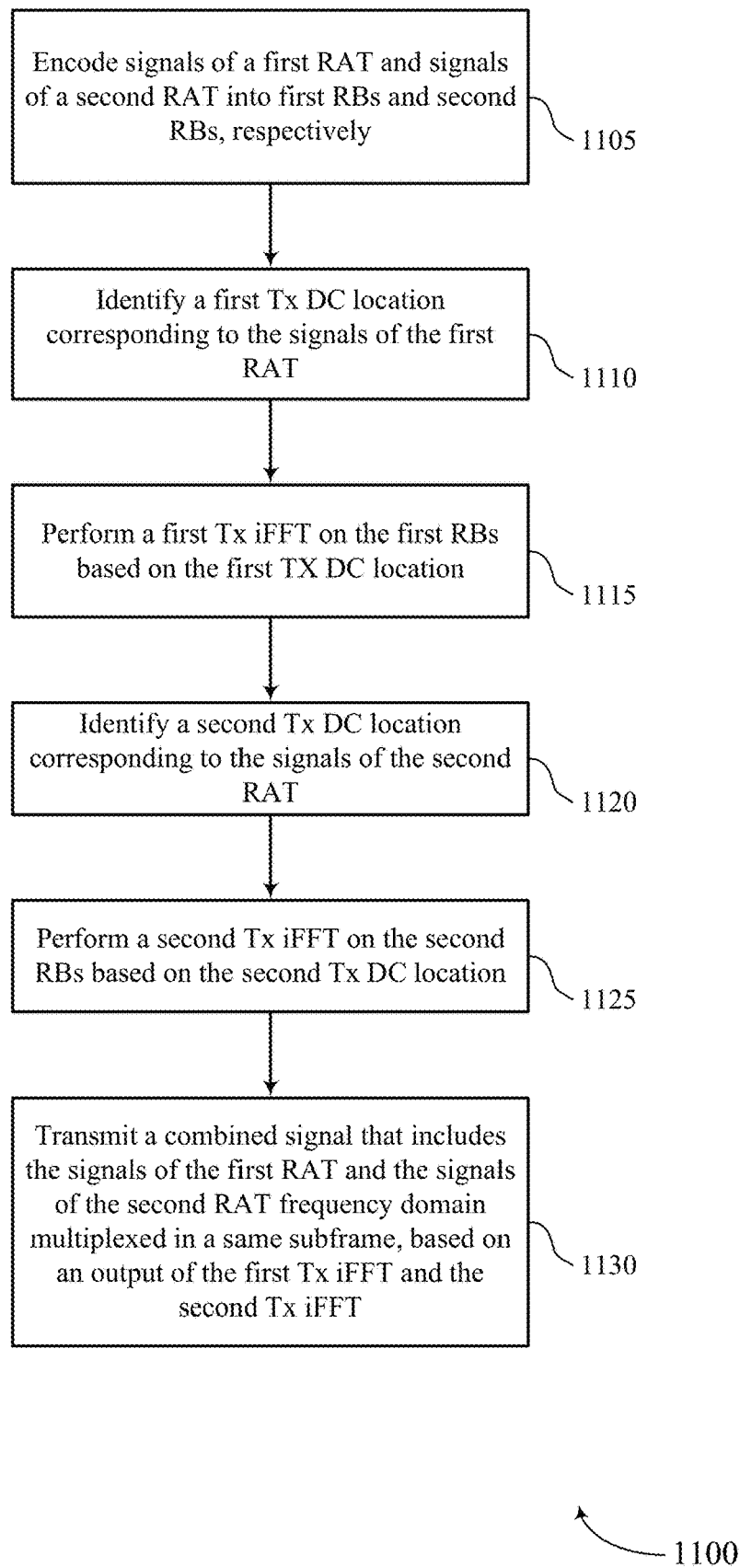
FIG. 11 illustrates an example of a flow chart that supports techniques for carrier sharing between radio access technologies in accordance with aspects of the present disclosure.

FIG. 11 shows a flowchart illustrating a method 1100 for techniques for carrier sharing between radio access technologies in accordance with aspects of the present disclosure. The operations of method 1100 may be implemented by a UE 115 or 210 or its components as described herein. For example, the operations of method 1100 may be performed by a UE communications manager as described with reference to FIGS. 16 through 19. In some examples, a UE 115, 210 may execute a set of codes to control the functional elements of the device to perform the functions described below. Additionally or alternatively, the UE 115, 210 may perform aspects of the functions described below using special-purpose hardware.

The method 1100 illustrates an example where the UE 115 may be configured to use two transmit chains with two iFFTs to encode the first RAT signals in the combined signal and the second RAT signals in the combined signal. For example, a first transmit chain may be dedicated to signals of the first RAT (e.g., NR) and a second transmit chain may be dedicated to signals of the second RAT (e.g., LTE). In the transmit chain for the first RAT, after applying a first iFFT associated with the first RAT to the first RAT RBs, the UE 115 may insert the first RAT RBs into the combined signal. In the transmit chain for the second RAT, after applying a second iFFT associated with the second RAT to the second RAT RBs, the UE 115 may insert the second RAT RBs into the combined signal. By doing the above, the base station 105 may combine the first RAT signals from the second RAT signals. After the signals are combined, the UE 115 may transmit the combined signal.

At block 1105 the UE 115 may encode signals of a first RAT and signals of a second RAT into first RBs and second RBs, respectively. The operations of block 1105 may be performed according to the methods described herein. In certain examples, aspects of the operations of block 1105 may be performed by a encoding manager as described with reference to FIGS. 16 through 19.

At block 1110 the UE 115 may identify a first Tx DC location corresponding to the signals of the first RAT. The operations of block 1110 may be performed according to the methods described herein. In certain examples, aspects of the operations of block 1110 may be performed by a location manager as described with reference to FIGS. 16 through 19.

At block 1115 the UE 115 may perform a first Tx iFFT on the first RBs based on the first TX DC location. The operations of block 1115 may be performed according to the methods described herein. In certain examples, aspects of the operations of block 1115 may be performed by a iFFT manager as described with reference to FIGS. 16 through 19.

At block 1120 the UE 115 may identify a second Tx DC location corresponding to the signals of the second RAT. The operations of block 1120 may be performed according to the methods described herein. In certain examples, aspects of the operations of block 1120 may be performed by a location manager as described with reference to FIGS. 16 through 19.

At block 1125 the UE 115 may perform a second Tx iFFT on the second RBs based on the second Tx DC location. The operations of block 1125 may be performed according to the methods described herein. In certain examples, aspects of the operations of block 1125 may be performed by a iFFT manager as described with reference to FIGS. 16 through 19.

At block 1130 the UE 115 may transmit a combined signal that includes the signals of the first RAT and the signals of the second RAT frequency domain multiplexed in a same subframe, based on an output of the first Tx iFFT and the second Tx iFFT. The operations of block 1130 may be performed according to the methods described herein. In certain examples, aspects of the operations of block 1130 may be performed by a transmitter as described with reference to FIGS. 16 through 19.

It should be noted that the methods described above describe possible implementations, and that the operations and the steps may be rearranged or otherwise modified and that other implementations are possible. Furthermore, aspects from two or more of the methods may be combined.

Figure 12:
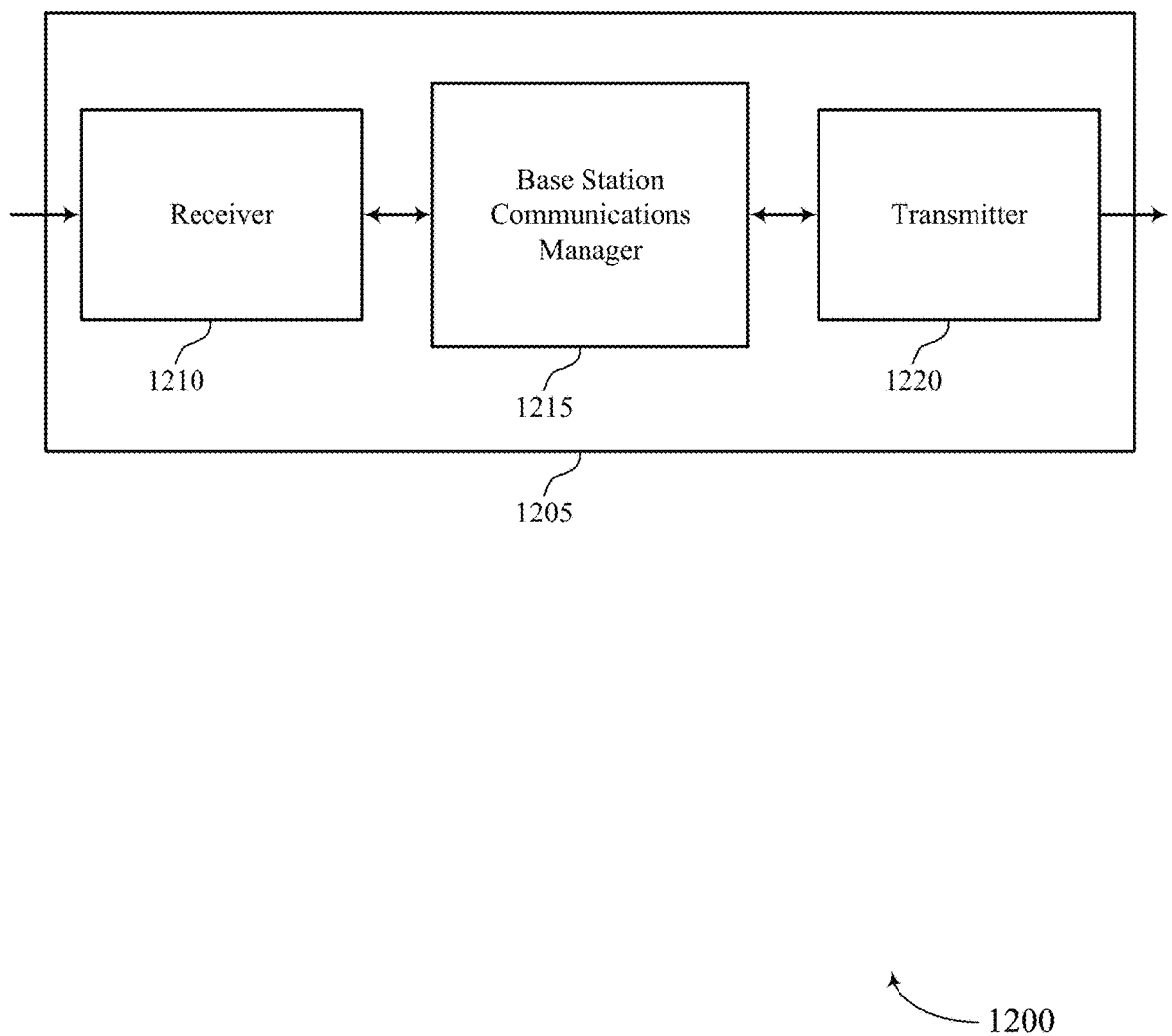
FIGS. 12 through 14 show block diagrams of a device that supports techniques for carrier sharing between radio access technologies in accordance with aspects of the present disclosure.

FIG. 12 shows a block diagram 1200 of a wireless device 1205 that supports techniques for carrier sharing between radio access technologies in accordance with aspects of the present disclosure. Wireless device 1205 may be an example of aspects of a base station 105 as described herein. Wireless device 1205 may include receiver 1210, base station communications manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to techniques for carrier sharing between radio access technologies, etc.). Information may be passed on to other components of the device. The receiver 1210 may be an example of aspects of the transceiver 1535 described with reference to FIG. 15. The receiver 1210 may utilize a single antenna or a set of antennas.

Receiver 1210 may receive a combined signal that includes signals of a first RAT and signals of a second RAT that are frequency domain multiplexed in a same subframe. In some cases, the combined signal is a result of MU-MIMO communications.

Base station communications manager 1215 may be an example of aspects of the base station communications manager 1515 described with reference to FIG. 15.

Base station communications manager 1215 and/or at least some of its various sub-components may be implemented in hardware, software executed by a processor, firmware, or any combination thereof. If implemented in software executed by a processor, the functions of the base station communications manager 1215 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The base station communications manager 1215 and/or at least some of its various sub-components may be physically located at various positions, including being distributed such that portions of functions are implemented at different physical locations by one or more physical devices. In some examples, base station communications manager 1215 and/or at least some of its various sub-components may be a separate and distinct component in accordance with various aspects of the present disclosure. In other examples, base station communications manager 1215 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1215 may identify a first Tx DC location corresponding to the signals of the first RAT, identify a second Tx DC location corresponding to the signals of the second RAT, select one of the first Tx DC location or the second Tx DC location as a common Rx DC location, perform a common Rx FFT on the combined signal based on the common Rx DC location, and decode the signals of the first RAT and the signals of the second RAT based on an output of the common Rx FFT. The base station communications manager 1215 may also identify a first Tx DC location corresponding to the signals of the first RAT, perform a first Rx FFT on the combined signal based on the first Rx DC location, identify a second Tx DC location corresponding to the signals of the second RAT, perform a second Rx FFT on a duplicate of the combined signal based on the second Rx DC location, and decode the signals of the first RAT and the signals of the second RAT based on an output of the first Rx FFT and the second Rx FFT.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1535 described with reference to FIG. 15. The transmitter 1220 may utilize a single antenna or a set of antennas.

Figure 13:
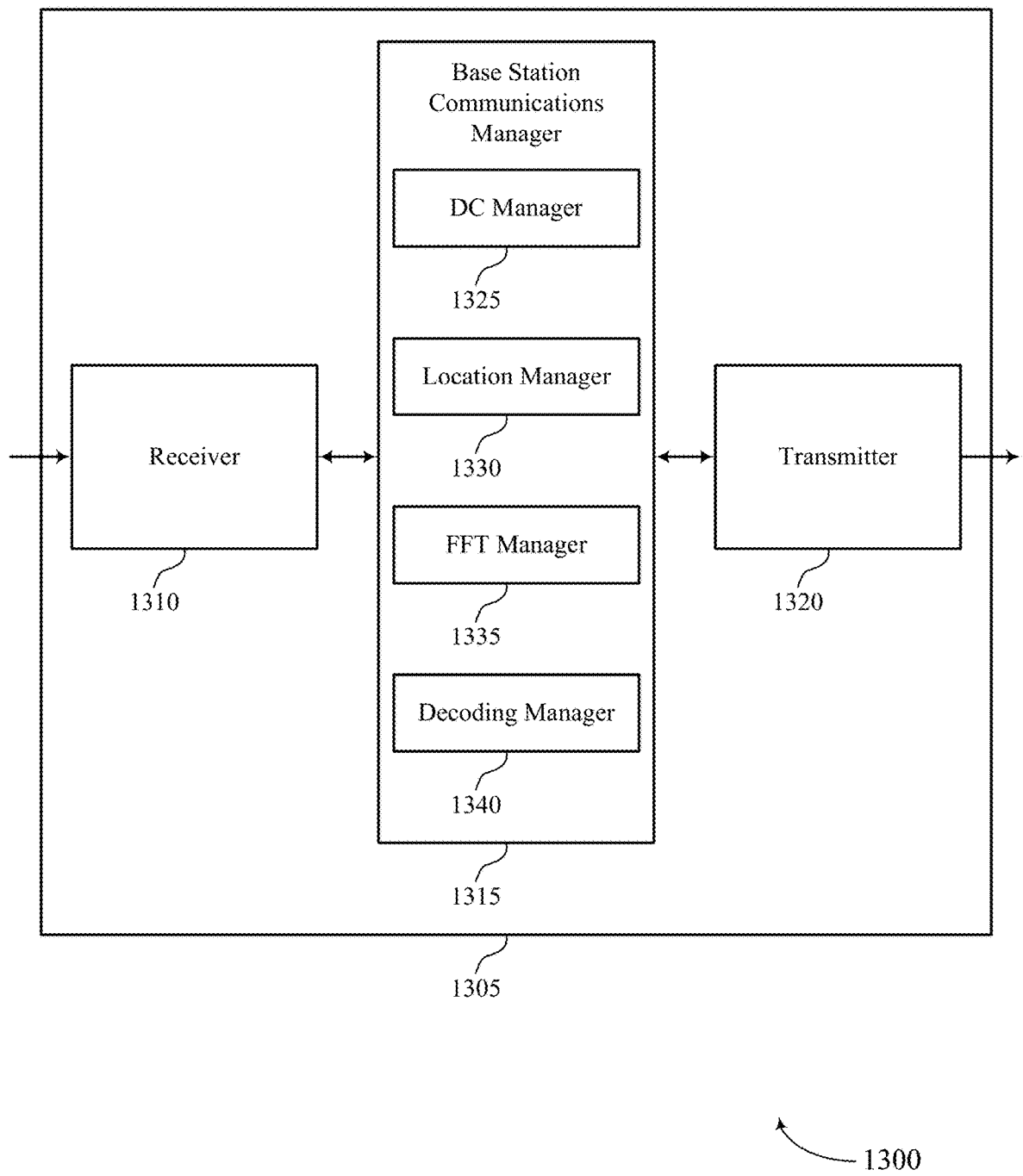

FIG. 13 shows a block diagram 1300 of a wireless device 1305 that supports techniques for carrier sharing between radio access technologies in accordance with aspects of the present disclosure. Wireless device 1305 may be an example of aspects of a wireless device 1205 or a base station 105 as described with reference to FIG. 12. Wireless device 1305 may include receiver 1310, base station communications manager 1315, and transmitter 1320. Wireless device 1305 may also include a processor. Each of these components may be in communication with one another (e.g., via one or more buses).

Receiver 1310 may receive information such as packets, user data, or control information associated with various information channels (e.g., control channels, data channels, and information related to techniques for carrier sharing between radio access technologies, etc.). Information may be passed on to other components of the device. The receiver 1310 may be an example of aspects of the transceiver 1535 described with reference to FIG. 15. The receiver 1310 may utilize a single antenna or a set of antennas.

Base station communications manager 1315 may be an example of aspects of the base station communications manager 1515 described with reference to FIG. 15. Base station communications manager 1315 may also include DC manager 1325, location manager 1330, FFT manager 1335, and decoding manager 1340.

DC manager 1325 may identify a first Tx DC location corresponding to the signals of the first RAT and identify a second Tx DC location corresponding to the signals of the second RAT. In some cases, the first Tx DC location and the second Tx DC location vary by a half tone shift. In some cases, the first RAT applies a half tone shift to UL communications. In some cases, the first DC location is selected as the common Rx DC location. In some cases, the second DC location is selected as the common Rx DC location.

Location manager 1330 may select one of the first Tx DC location or the second Tx DC location as a common Rx DC location, identify a first Tx DC location corresponding to the signals of the first RAT, and identify a second Tx DC location corresponding to the signals of the second RAT.

FFT manager 1335 may perform a common Rx FFT on the combined signal based on the common Rx DC location, perform a first Rx FFT on the combined signal based on the first Rx DC location, and perform a second Rx FFT on a duplicate of the combined signal based on the second Rx DC location.

Decoding manager 1340 may decode the signals of the first RAT and the signals of the second RAT based on an output of the common Rx FFT and decode the signals of the first RAT and the signals of the second RAT based on an output of the first Rx FFT and the second Rx FFT. In some cases, decoding the signals of the first RAT and the signals of the second RAT includes: separating the output of the common Rx FFT into RBs associated with the first RAT and RBs associated with the second RAT. In some cases, decoding the signals of the first RAT and the signals of the second RAT includes: separating the output of the common Rx FFT into RBs associated with the first RAT and RBs associated with the second RAT. In some cases, decoding the signals of the first RAT and the signals of the second RAT includes: separating the output of the common Rx FFT into RBs associated with the first RAT and RBs associated with the second RAT. In some cases, decoding the signals of the first RAT and the signals of the second RAT includes: separating the output of the first Rx FFT into RBs associated with the first RAT and RBs associated with the second RAT. In some cases, decoding the signals of the first RAT and the signals of the second RAT includes: separating the output of the second Rx FFT into RBs associated with the first RAT and RBs associated with the second RAT.

Transmitter 1320 may transmit signals generated by other components of the device. In some examples, the transmitter 1320 may be collocated with a receiver 1310 in a transceiver module. For example, the transmitter 1320 may be an example of aspects of the transceiver 1535 described with reference to FIG. 15. The transmitter 1320 may utilize a single antenna or a set of antennas.

Figure 14:
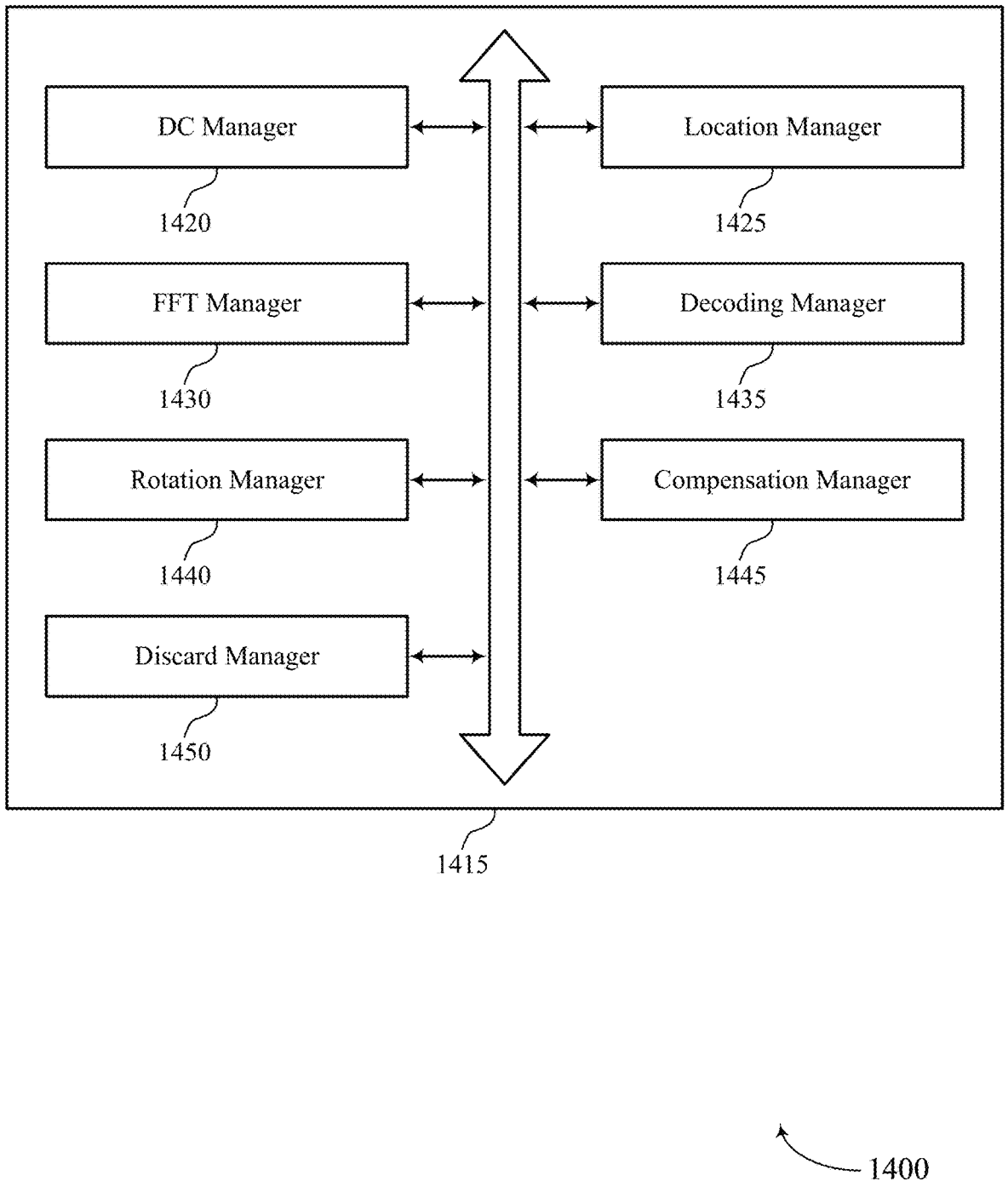

FIG. 14 shows a block diagram 1400 of a base station communications manager 1415 that supports techniques for carrier sharing between radio access technologies in accordance with aspects of the present disclosure. The base station communications manager 1415 may be an example of aspects of a base station communications manager 1215, a base station communications manager 1315, or a base station communications manager 1515 described with reference to FIGS. 12, 13, and 15. The base station communications manager 1415 may include DC manager 1420, location manager 1425, FFT manager 1430, decoding manager 1435, rotation manager 1440, compensation manager 1445, and discard manager 1450. Each of these modules may communicate, directly or indirectly, with one another (e.g., via one or more buses).

DC manager 1420 may identify a first Tx DC location corresponding to the signals of the first RAT and identify a second Tx DC location corresponding to the signals of the second RAT. In some cases, the first Tx DC location and the second Tx DC location vary by a half tone shift. In some cases, the first RAT applies a half tone shift to UL communications. In some cases, the first DC location is selected as the common Rx DC location. In some cases, the second DC location is selected as the common Rx DC location.

Location manager 1425 may select one of the first Tx DC location or the second Tx DC location as a common Rx DC location, identify a first Tx DC location corresponding to the signals of the first RAT, and identify a second Tx DC location corresponding to the signals of the second RAT.

FFT manager 1430 may perform a common Rx FFT on the combined signal based on the common Rx DC location, perform a first Rx FFT on the combined signal based on the first Rx DC location, and perform a second Rx FFT on a duplicate of the combined signal based on the second Rx DC location.

Decoding manager 1435 may decode the signals of the first RAT and the signals of the second RAT based on an output of the common Rx FFT and decode the signals of the first RAT and the signals of the second RAT based on an output of the first Rx FFT and the second Rx FFT. In some cases, decoding the signals of the first RAT and the signals of the second RAT includes: separating the output of the common Rx FFT into RBs associated with the first RAT and RBs associated with the second RAT. In some cases, decoding the signals of the first RAT and the signals of the second RAT includes: separating the output of the common Rx FFT into RBs associated with the first RAT and RBs associated with the second RAT. In some cases, decoding the signals of the first RAT and the signals of the second RAT includes: separating the output of the common Rx FFT into RBs associated with the first RAT and RBs associated with the second RAT. In some cases, decoding the signals of the first RAT and the signals of the second RAT includes: separating the output of the first Rx FFT into RBs associated with the first RAT and RBs associated with the second RAT. In some cases, decoding the signals of the first RAT and the signals of the second RAT includes: separating the output of the second Rx FFT into RBs associated with the first RAT and RBs associated with the second RAT.

Rotation manager 1440 may apply a half tone rotation to the combined signal prior to performing the common Rx FFT and apply a half tone rotation to the combined signal prior to performing the first Rx FFT.

Compensation manager 1445 may process the RBs associated with the second RAT by applying a respective complex phase compensation value to each tone output, process the RBs associated with the first RAT by applying a respective complex phase compensation value to each tone output, process either the RBs associated with the first RAT or the RBs associated with the second RAT by applying a respective complex phase compensation value to each tone output, and determine the respective complex phase compensation values via a look-up table (LUT) or through computation. In some cases, processing either the RBs associated with the first RAT or the RBs associated with the second RAT includes: multiplying each tone output by the respective complex phase compensation value. In some cases, the respective complex phase compensation values are each based on a symbol index, a cyclic prefix (CP) type, or a combination thereof.

Discard manager 1450 may discard RBs associated with the first RAT while decoding the signals of the second RAT. In some cases, decoding the signals of the first RAT and the signals of the second RAT includes: discarding RBs associated with the second RAT while decoding the signals of the first RAT.

Figure 15:
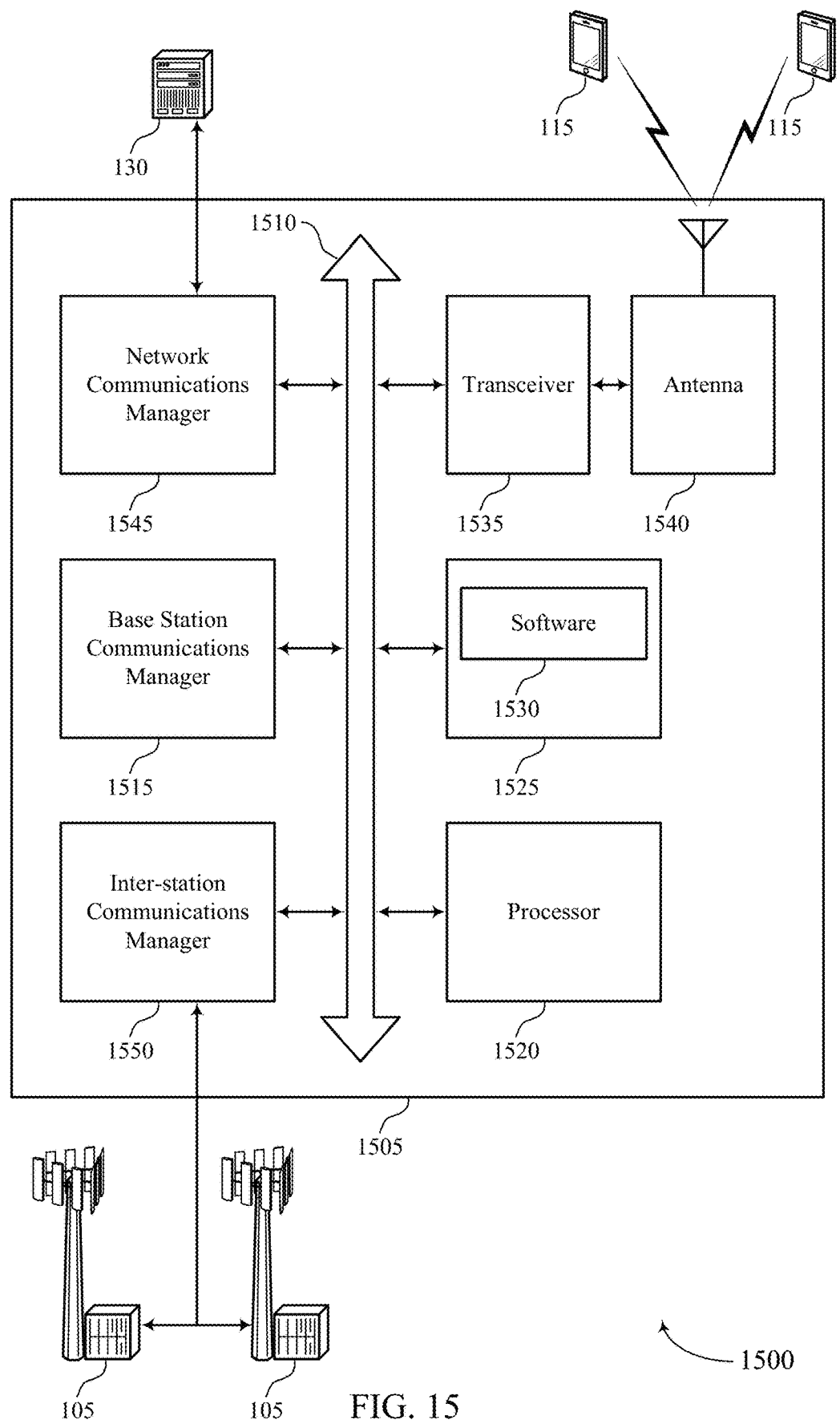
FIG. 15 illustrates a block diagram of a system including a base station that supports techniques for carrier sharing between radio access technologies in accordance with aspects of the present disclosure.

FIG. 15 shows a diagram of a system 1500 including a device 1505 that supports techniques for carrier sharing between radio access technologies in accordance with aspects of the present disclosure. Device 1505 may be an example of or include the components of wireless device 1205, wireless device 1305, or a base station 105 as described above, e.g., with reference to FIGS. 12 and 13. Device 1505 may include components for bi-directional voice and data communications including components for transmitting and receiving communications, including base station communications manager 1515, processor 1520, memory 1525, software 1530, transceiver 1535, antenna 1540, network communications manager 1545, and inter-station communications manager 1550. These components may be in electronic communication via one or more buses (e.g., bus 1510). Device 1505 may communicate wirelessly with one or more UEs 115.

Processor 1520 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1520 may be configured to operate a memory array using a memory controller. In other cases, a memory controller may be integrated into processor 1520. Processor 1520 may be configured to execute computer-readable instructions stored in a memory to perform various functions (e.g., functions or tasks supporting techniques for carrier sharing between radio access technologies).

Memory 1525 may include random access memory (RAM) and read only memory (ROM). The memory 1525 may store computer-readable, computer-executable software 1530 including instructions that, when executed, cause the processor to perform various functions described herein. In some cases, the memory 1525 may contain, among other things, a basic input/output system (BIOS) which may control basic hardware or software operation such as the interaction with peripheral components or devices.

Software 1530 may include code to implement aspects of the present disclosure, including code to support techniques for carrier sharing between radio access technologies. Software 1530 may be stored in a non-transitory computer-readable medium such as system memory or other memory. In some cases, the software 1530 may not be directly executable by the processor but may cause a computer (e.g., when compiled and executed) to perform functions described herein.

Transceiver 1535 may communicate bi-directionally, via one or more antennas, wired, or wireless links as described above. For example, the transceiver 1535 may represent a wireless transceiver and may communicate bi-directionally with another wireless transceiver. The transceiver 1535 may also include a modem to modulate the packets and provide the modulated packets to the antennas for transmission, and to demodulate packets received from the antennas.

In some cases, the wireless device may include a single antenna 1540. However, in some cases the device may have more than one antenna 1540, which may be capable of concurrently transmitting or receiving multiple wireless transmissions.

Network communications manager 1545 may manage communications with the core network (e.g., via one or more wired backhaul links). For example, the network communications manager 1545 may manage the transfer of data communications for client devices, such as one or more UEs 115.

Inter-station communications manager 1550 may manage communications with other base station 105, and may include a controller or scheduler for controlling communications with UEs 115 in cooperation with other base stations 105. For example, the inter-station communications manager 1550 may coordinate scheduling for transmissions to UEs 115 for various interference mitigation techniques such as beamforming or joint transmission. In some examples, inter-station communications manager 1550 may provide an X2 interface within an LTE/LTE-A wireless communication network technology to provide communication between base stations 105.

Figure 16:
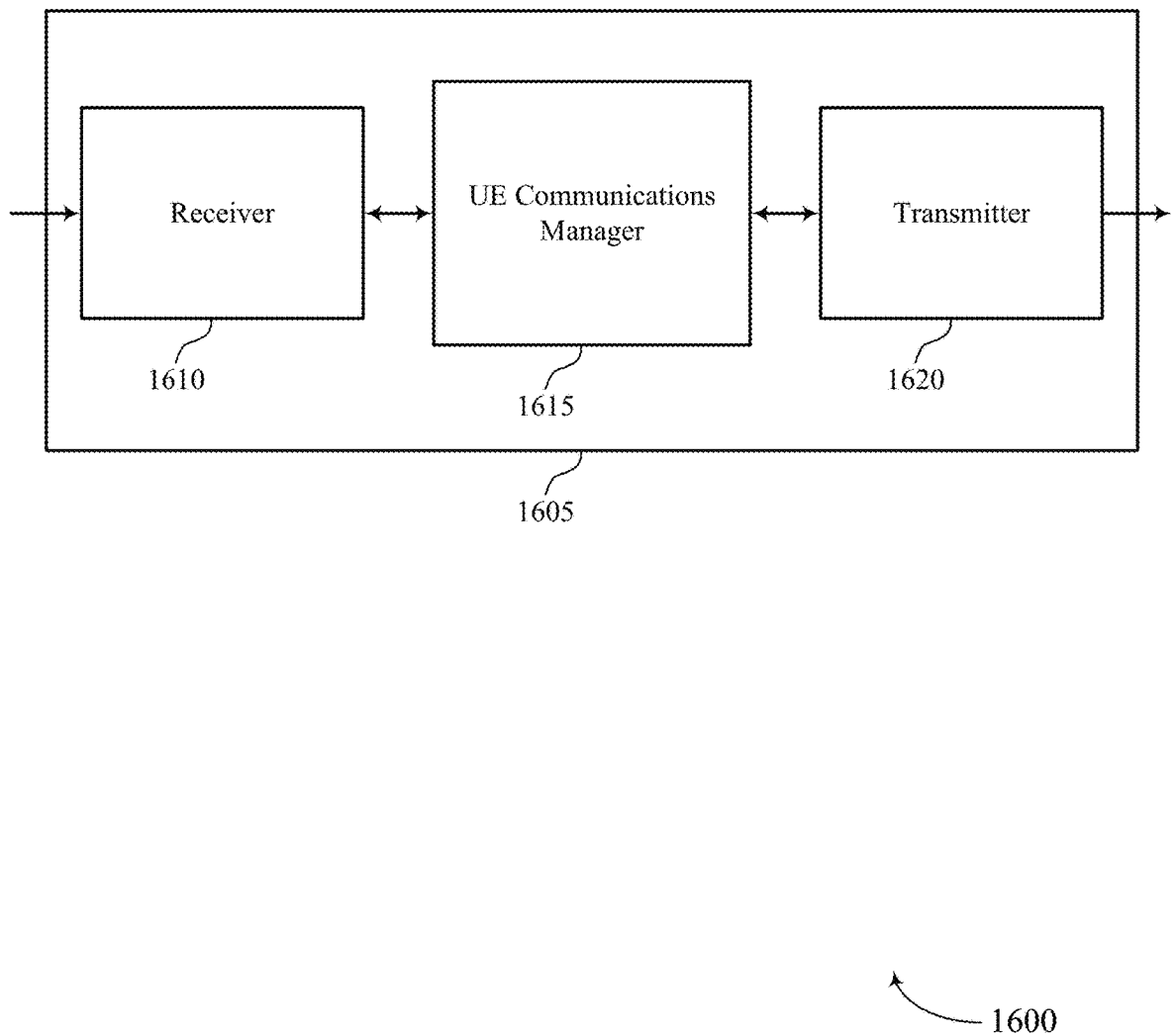
FIGS. 16 through 18 show block diagrams of a device that supports techniques for carrier sharing between radio access technologies in accordance with aspects of the present disclosure.

FIG. 16 shows a block diagram 1600 of a wireless device 1605 that supports techniques for carrier sharing between radio access technologies in accordance with aspects of the present disclosure. Wireless device 1605 may be an example of aspects of a UE 115 as described herein. Wireless device 1605 may include receiver 1610, UE communications manager 1615, and transmitter 1620. Wireless device 1605 may also include a processor. Each of these components may be in communication with one another (e.g., via one or more buses).

Receiver 1610 may receive information such as packets, user data, or control information associated with various information channels (e.g., control channels, data channels, and information related to techniques for carrier sharing between radio access technologies, etc.). Information may be passed on to other components of the device. The receiver 1610 may be an example of aspects of the transceiver 1935 described with reference to FIG. 19. The receiver 1610 may utilize a single antenna or a set of antennas.

UE communications manager 1615 may be an example of aspects of the UE communications manager 1915 described with reference to FIG. 19. UE communications manager 1615 and/or at least some of its various sub-components may be implemented in hardware, software executed by a processor, firmware, or any combination thereof. If implemented in software executed by a processor, the functions of the UE communications manager 1615 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The UE communications manager 1615 and/or at least some of its various sub-components may be physically located at various positions, including being distributed such that portions of functions are implemented at different physical locations by one or more physical devices. In some examples, UE communications manager 1615 and/or at least some of its various sub-components may be a separate and distinct component in accordance with various aspects of the present disclosure. In other examples, UE communications manager 1615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 1615 may encode signals of a first RAT and signals of a second RAT into first RBs and second RBs, respectively, identify a first Tx DC location corresponding to the signals of the first RAT, identify a second Tx DC location corresponding to the signals of the second RAT, select one of the first Tx DC location or the second Tx DC location as a common Tx DC location, and perform a common Tx iFFT on the first RBs and the second RBs based on the common Tx DC location. The UE communications manager 1615 may also encode signals of a first RAT and signals of a second RAT into first RBs and second RBs, respectively, identify a first Tx DC location corresponding to the signals of the first RAT, perform a first Tx iFFT on the first RBs based on the first TX DC location, identify a second Tx DC location corresponding to the signals of the second RAT, and perform a second Tx iFFT on the second RBs based on the second Tx DC location.

Transmitter 1620 may transmit signals generated by other components of the device. In some examples, the transmitter 1620 may be collocated with a receiver 1610 in a transceiver module. For example, the transmitter 1620 may be an example of aspects of the transceiver 1935 described with reference to FIG. 19. The transmitter 1620 may utilize a single antenna or a set of antennas.

Transmitter 1620 may transmit a combined signal that includes the signals of the first RAT and the signals of the second RAT frequency domain multiplexed in a same subframe, based on an output of the common Tx iFFT and transmit a combined signal that includes the signals of the first RAT and the signals of the second RAT frequency domain multiplexed in a same subframe, based on an output of the first Tx iFFT and the second Tx iFFT.

Figure 17:
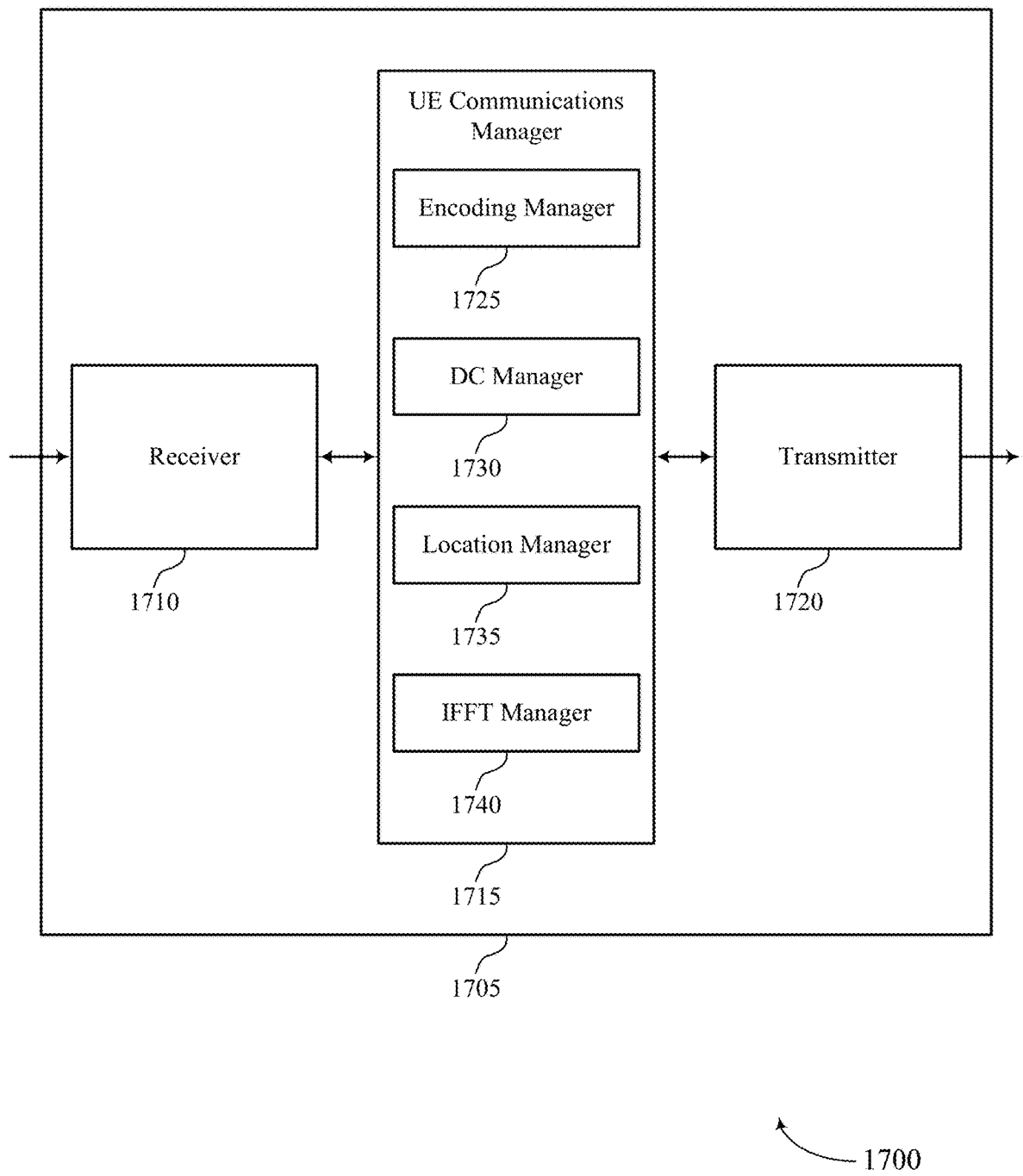

FIG. 17 shows a block diagram 1700 of a wireless device 1705 that supports techniques for carrier sharing between radio access technologies in accordance with aspects of the present disclosure. Wireless device 1705 may be an example of aspects of a wireless device 1605 or a UE 115 as described with reference to FIG. 16. Wireless device 1705 may include receiver 1710, UE communications manager 1715, and transmitter 1720. Wireless device 1705 may also include a processor. Each of these components may be in communication with one another (e.g., via one or more buses).

Receiver 1710 may receive information such as packets, user data, or control information associated with various information channels (e.g., control channels, data channels, and information related to techniques for carrier sharing between radio access technologies, etc.). Information may be passed on to other components of the device. The receiver 1710 may be an example of aspects of the transceiver 1935 described with reference to FIG. 19. The receiver 1710 may utilize a single antenna or a set of antennas.

UE communications manager 1715 may be an example of aspects of the UE communications manager 1915 described with reference to FIG. 19. UE communications manager 1715 may also include encoding manager 1725, DC manager 1730, location manager 1735, and iFFT manager 1740.

Encoding manager 1725 may encode signals of a first RAT and signals of a second RAT into first RBs and second RBs, respectively. In some cases, encoding the signals of the first RAT and the signals of the second RAT includes: processing the RBs associated with the first RAT by applying a respective complex phase compensation value to each tone input.

DC manager 1730 may identify a first Tx DC location corresponding to the signals of the first RAT and identify a second Tx DC location corresponding to the signals of the second RAT. In some cases, the first Tx DC location and the second Tx DC location vary by a half tone shift. In some cases, the first RAT applies a half tone shift to UL communications.

Location manager 1735 may select one of the first Tx DC location or the second Tx DC location as a common Tx DC location, identify a first Tx DC location corresponding to the signals of the first RAT, and identify a second Tx DC location corresponding to the signals of the second RAT. In some cases, the first DC location is selected as the common Tx DC location. In some cases, the second DC location is selected as the common Tx DC location.

IFFT manager 1740 may perform a common Tx iFFT on the first RBs and the second RBs based on the common Tx DC location, perform a first Tx iFFT on the first RBs based on the first TX DC location, and perform a second Tx iFFT on the second RBs based on the second Tx DC location. In some cases, the first Tx iFFT and the second Tx iFFT are performed by a first Tx chain and a second Tx chain, respectively, when the UE is UL MIMO capable. In some cases, the first Tx iFFT and the second Tx iFFT are performed by a first Tx chain and a second Tx chain, respectively, when the UE is UL MIMO capable or intraband non-contiguous CA capable. In some cases, the first Tx chain and the second Tx chain are independent of each other and each have separate power amplifiers (PAs).

Transmitter 1720 may transmit signals generated by other components of the device. In some examples, the transmitter 1720 may be collocated with a receiver 1710 in a transceiver module. For example, the transmitter 1720 may be an example of aspects of the transceiver 1935 described with reference to FIG. 19. The transmitter 1720 may utilize a single antenna or a set of antennas.

Figure 18:
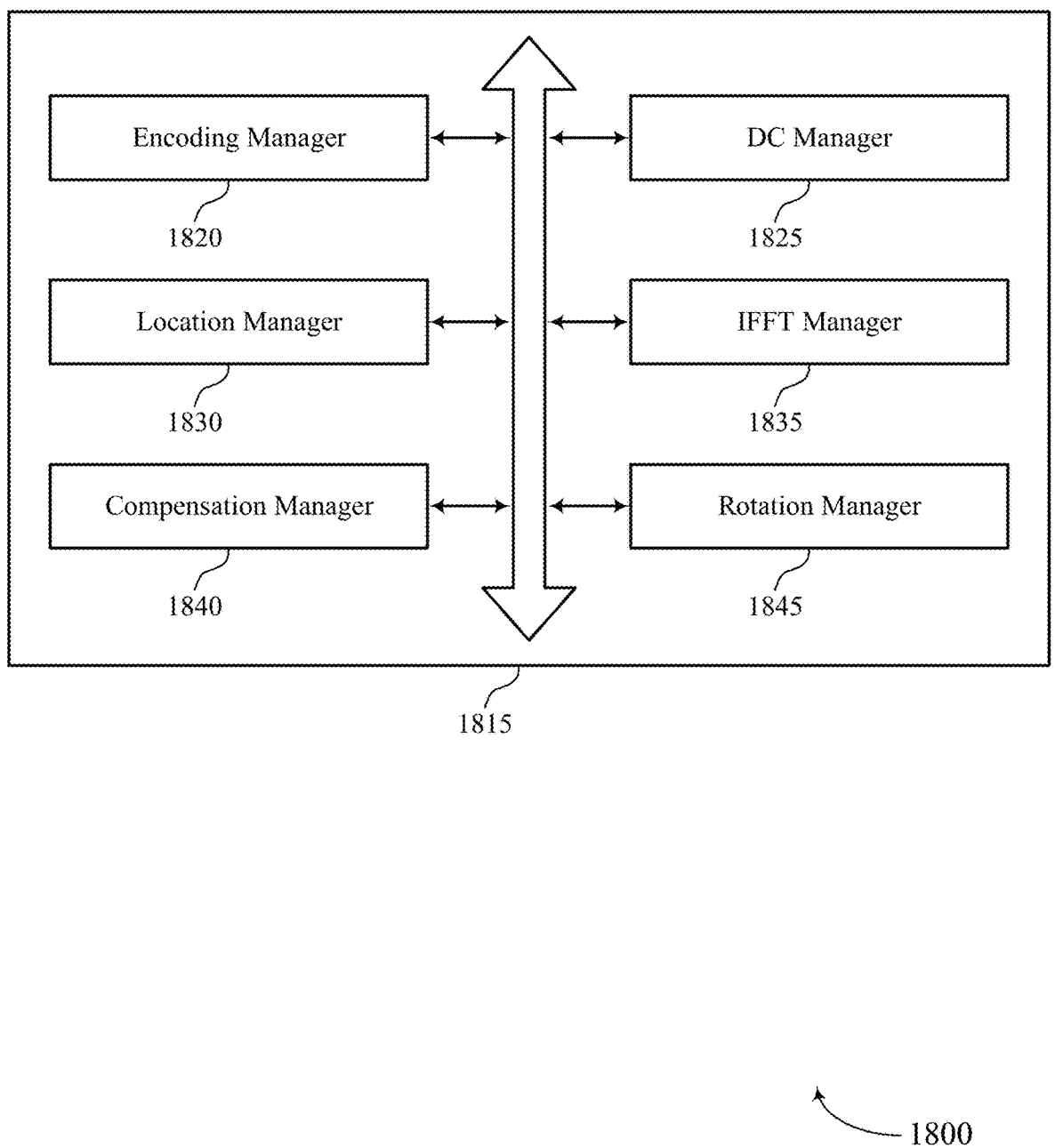

FIG. 18 shows a block diagram 1800 of a UE communications manager 1815 that supports techniques for carrier sharing between radio access technologies in accordance with aspects of the present disclosure. The UE communications manager 1815 may be an example of aspects of a UE communications manager 1915 described with reference to FIGS. 16, 17, and 19. The UE communications manager 1815 may include encoding manager 1820, DC manager 1825, location manager 1830, iFFT manager 1835, compensation manager 1840, and rotation manager 1845. Each of these modules may communicate, directly or indirectly, with one another (e.g., via one or more buses).

Encoding manager 1820 may encode signals of a first RAT and signals of a second RAT into first RBs and second RBs, respectively. In some cases, encoding the signals of the first RAT and the signals of the second RAT includes: processing the RBs associated with the first RAT by applying a respective complex phase compensation value to each tone input.

DC manager 1825 may identify a first Tx DC location corresponding to the signals of the first RAT and identify a second Tx DC location corresponding to the signals of the second RAT. In some cases, the first Tx DC location and the second Tx DC location vary by a half tone shift. In some cases, the first RAT applies a half tone shift to UL communications.

Location manager 1830 may select one of the first Tx DC location or the second Tx DC location as a common Tx DC location, identify a first Tx DC location corresponding to the signals of the first RAT, and identify a second Tx DC location corresponding to the signals of the second RAT. In some cases, the first DC location is selected as the common Tx DC location. In some cases, the second DC location is selected as the common Tx DC location.

IFFT manager 1835 may perform a common Tx iFFT) on the first RBs and the second RBs based on the common Tx DC location, perform a first Tx iFFT on the first RBs based on the first TX DC location, and perform a second Tx iFFT on the second RBs based on the second Tx DC location. In some cases, the first Tx iFFT and the second Tx iFFT are performed by a first Tx chain and a second Tx chain, respectively, when the UE is UL MIMO capable. In some cases, the first Tx iFFT and the second Tx iFFT are performed by a first Tx chain and a second Tx chain, respectively, when the UE is UL MIMO capable or intraband non-contiguous CA capable. In some cases, the first Tx chain and the second Tx chain are independent of each other and each have separate PAs.

Compensation manager 1840 may determine the respective complex phase compensation values via a LUT or through computation. In some cases, encoding the signals of the first RAT and the signals of the second RAT includes: processing the RBs associated with the second RAT by applying a respective complex phase compensation value to each tone input. In some cases, encoding the signals of the first RAT and the signals of the second RAT includes: processing either the RBs associated with the first RAT or the RBs associated with the second RAT by applying a respective complex phase compensation value to each tone input. In some cases, processing either the RBs associated with the first RAT or the RBs associated with the second RAT includes: multiplying each tone output by the respective complex phase compensation value. In some cases, the respective complex phase compensation values are each based on a symbol index, a CP type, or a combination thereof.

Rotation manager 1845 may apply a half tone rotation to the combined signal after performing the common Tx iFFT and before transmitting the combined signal.

Figure 19:
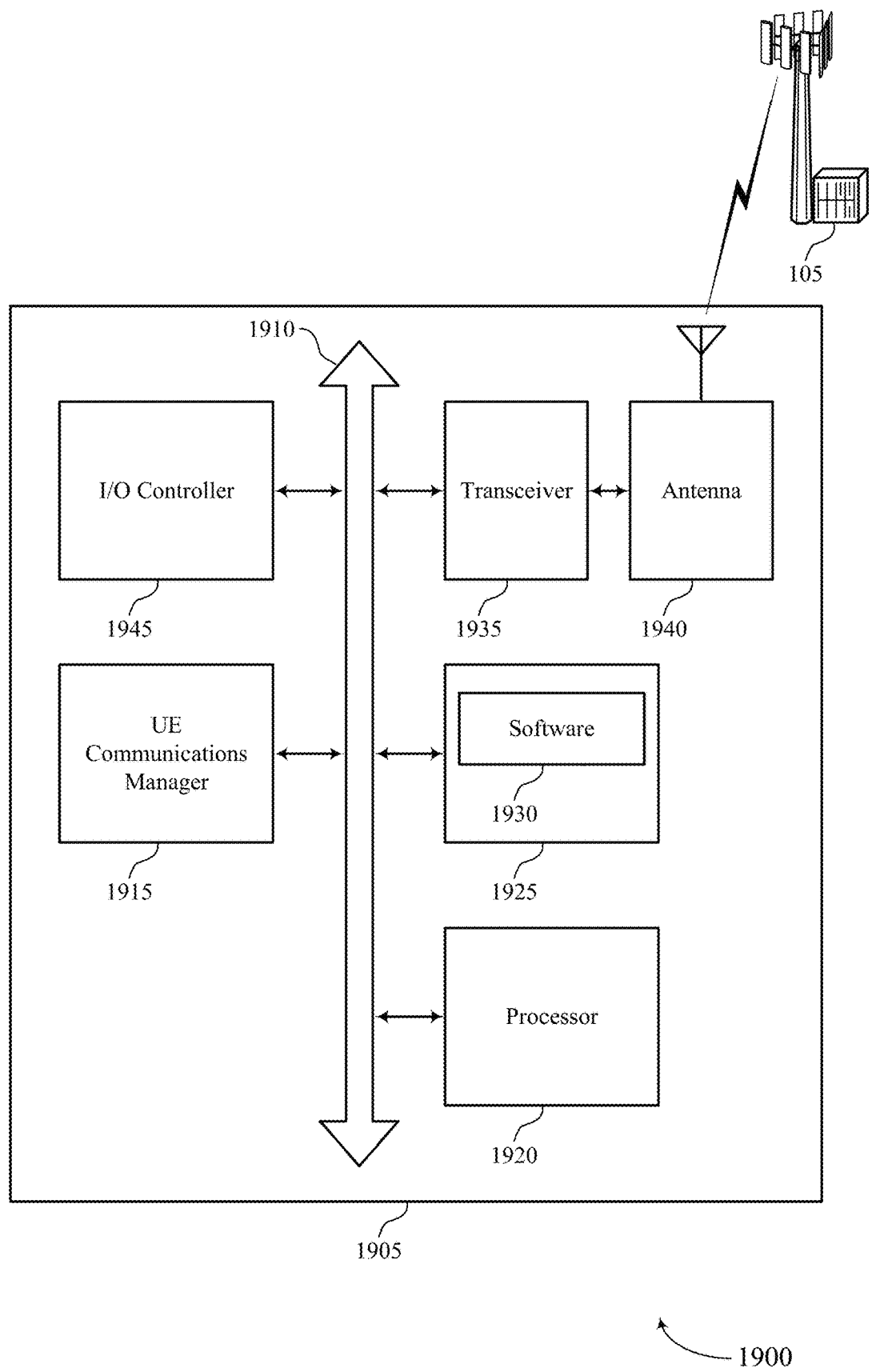
FIG. 19 illustrates a block diagram of a system including a user equipment (UE) that supports techniques for carrier sharing between radio access technologies in accordance with aspects of the present disclosure.

FIG. 19 shows a diagram of a system 1900 including a device 1905 that supports techniques for carrier sharing between radio access technologies in accordance with aspects of the present disclosure. Device 1905 may be an example of or include the components of UE 115 as described above, e.g., with reference to FIG. 1. Device 1905 may include components for bi-directional voice and data communications including components for transmitting and receiving communications, including UE communications manager 1915, processor 1920, memory 1925, software 1930, transceiver 1935, antenna 1940, and I/O controller 1945. These components may be in electronic communication via one or more buses (e.g., bus 1910). Device 1905 may communicate wirelessly with one or more base stations 105.

Processor 1920 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1920 may be configured to operate a memory array using a memory controller. In other cases, a memory controller may be integrated into processor 1920. Processor 1920 may be configured to execute computer-readable instructions stored in a memory to perform various functions (e.g., functions or tasks supporting techniques for carrier sharing between radio access technologies).

Memory 1925 may include RAM and ROM. The memory 1925 may store computer-readable, computer-executable software 1930 including instructions that, when executed, cause the processor to perform various functions described herein. In some cases, the memory 1925 may contain, among other things, a BIOS which may control basic hardware or software operation such as the interaction with peripheral components or devices.

Software 1930 may include code to implement aspects of the present disclosure, including code to support techniques for carrier sharing between radio access technologies. Software 1930 may be stored in a non-transitory computer-readable medium such as system memory or other memory. In some cases, the software 1930 may not be directly executable by the processor but may cause a computer (e.g., when compiled and executed) to perform functions described herein.

Transceiver 1935 may communicate bi-directionally, via one or more antennas, wired, or wireless links as described above. For example, the transceiver 1935 may represent a wireless transceiver and may communicate bi-directionally with another wireless transceiver. The transceiver 1935 may also include a modem to modulate the packets and provide the modulated packets to the antennas for transmission, and to demodulate packets received from the antennas.

In some cases, the wireless device may include a single antenna 1940. However, in some cases the device may have more than one antenna 1940, which may be capable of concurrently transmitting or receiving multiple wireless transmissions.

I/O controller 1945 may manage input and output signals for device 1905. I/O controller 1945 may also manage peripherals not integrated into device 1905. In some cases, I/O controller 1945 may represent a physical connection or port to an external peripheral. In some cases, I/O controller 1945 may utilize an operating system such as iOS®, ANDROID®, MS-DOS®, MS-WINDOWS®, OS/2®, UNIX®, LINUX®, or another known operating system. In other cases, I/O controller 1945 may represent or interact with a modem, a keyboard, a mouse, a touchscreen, or a similar device. In some cases, I/O controller 1945 may be implemented as part of a processor. In some cases, a user may interact with device 1905 via I/O controller 1945 or via hardware components controlled by I/O controller 1945.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC- FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
receiving a combined signal that includes signals of a first radio access technology (RAT) and signals of a second RAT that are frequency domain multiplexed in a same subframe;
identifying a first transmit (Tx) direct current (DC) location corresponding to the signals of the first RAT;
identifying a second Tx DC location corresponding to the signals of the second RAT;
selecting one of the first Tx DC location or the second Tx DC location as a common receive (Rx) DC location;
performing a common Rx fast Fourier transform (FFT) on the combined signal based on the common Rx DC location;
decoding the signals of the first RAT and the signals of the second RAT based on an output of the common Rx FFT, wherein the decoding comprises separating the output of the common Rx FFT into resource blocks (RBs) associated with the first RAT and RBs associated with the second RAT; and
processing either the RBs associated with the first RAT or the RBs associated with the second RAT by applying a respective complex phase compensation value to each tone in either the RBs associated with the first RAT or the RBs associated with the second RAT.

2. The method of claim 1, wherein:
the first Tx DC location and the second Tx DC location vary by a half tone shift.

3. The method of claim 1, wherein:
the first RAT uses a half tone shift to uplink (UL) communications.

4. The method of claim 3, wherein selecting one of the first Tx DC location or the second Tx DC location further comprises:
selecting the first Tx DC location as the common Rx DC location.

5. The method of claim 4, further comprising:
applying a half tone rotation to the combined signal prior to performing the common Rx FFT.

6. The method of claim 5, wherein:
processing either the RBs associated with the first RAT or the RBs associated with the second RAT further comprises:
processing the RBs associated with the second RAT by applying the respective complex phase compensation value to each tone in the RBs associated with the second RAT.

7. The method of claim 3, wherein selecting one of the first Tx DC location or the second Tx DC location further comprises:
selecting the second Tx DC location as the common Rx DC location.

8. The method of claim 7, wherein:
processing either the RBs associated with the first RAT or the RBs associated with the second RAT further comprises:
processing the RBs associated with the first RAT by applying the respective complex phase compensation value to each tone in the RBs associated with the first RAT.

9. The method of claim 1, wherein processing either the RBs associated with the first RAT or the RBs associated with the second RAT further comprises:
multiplying each tone in either the RBs associated with the first RAT or the RBs associated with the second RAT, by the respective complex phase compensation value.

10. The method of claim 9, wherein:
the respective complex phase compensation values are each based on a symbol index, a cyclic prefix (CP) type, or a combination thereof.

11. The method of claim 9, further comprising:
determining the respective complex phase compensation values via a look-up table (LUT) or through computation.

12. A method for wireless communication, comprising:
encoding signals of a first radio access technology (RAT) and signals of a second RAT into first resource blocks (RBs) and second RBs, respectively, wherein the encoding comprises processing either the RBs associated with the first RAT or the RBs associated with the second RAT by applying a respective complex phase compensation value to each tone input;
identifying a first transmit (Tx) direct current (DC) location corresponding to the signals of the first RAT;
identifying a second Tx DC location corresponding to the signals of the second RAT;
selecting one of the first Tx DC location or the second Tx DC location as a common Tx DC location;
performing a common Tx inverse fast Fourier transform (iFFT) on the first RBs and the second RBs based on the common Tx DC location; and
transmitting a combined signal that includes the signals of the first RAT and the signals of the second RAT that are frequency domain multiplexed in a same subframe, based on an output of the common Tx iFFT.

13. The method of claim 12, wherein:
the first Tx DC location and the second Tx DC location vary by a half tone shift.

14. The method of claim 12, wherein the first RAT uses a half tone shift to uplink (UL) communications and wherein selecting one of the first Tx DC location or the second Tx DC location further comprises:
selecting the first Tx DC location as the common Tx DC location.

15. The method of claim 14, wherein
processing either the RBs associated with the first RAT or the RBs associated with the second RAT further comprises:
processing the RBs associated with the second RAT by applying the respective complex phase compensation value to each tone input.

16. The method of claim 15, further comprising:
applying a half tone rotation to the combined signal after performing the common Tx iFFT and before transmitting the combined signal.

17. The method of claim 14, wherein selecting one of the first Tx DC location or the second Tx DC location further comprises:
selecting the second Tx DC location as the common Tx DC location.

18. The method of claim 17, wherein
processing either the RBs associated with the first RAT or the RBs associated with the second RAT further comprises:
processing the RBs associated with the first RAT by applying the respective complex phase compensation value to each tone input.

19. The method of claim 12, wherein processing either the RBs associated with the first RAT or the RBs associated with the second RAT comprises:
multiplying each tone in either the RBs associated with the first RAT or the RBs associated with the second RAT, by the respective complex phase compensation value, wherein the respective complex phase compensation values are each based on a symbol index, a cyclic prefix (CP) type, or a combination thereof.

20. A method for wireless communication, comprising:
receiving a combined signal that includes signals of a first radio access technology (RAT) and signals of a second RAT that are frequency domain multiplexed in a same subframe;
identifying a first transmit (Tx) direct current (DC) location corresponding to the signals of the first RAT;
performing a first Rx fast Fourier transform (FFT) on the combined signal based on a first Rx DC location;
identifying a second Tx DC location corresponding to the signals of the second RAT;
performing a second Rx FFT on a duplicate of the combined signal based on a second Rx DC location; and
decoding the signals of the first RAT and the signals of the second RAT based on an output of the first Rx FFT and an output of the second Rx FFT.

21. The method of claim 20, wherein:
decoding the signals of the first RAT and the signals of the second RAT comprises: discarding resource blocks (RBs) associated with the second RAT while decoding the signals of the first RAT; and
the method further comprises: discarding RBs associated with the first RAT while decoding the signals of the second RAT.

22. The method of claim 20, wherein:
the combined signal is a result of multi-user multiple-input multiple-output (MU-MIMO) communications.

23. The method of claim 22, further comprising:
applying a half tone rotation to the combined signal prior to performing the first Rx FFT.

24. The method of claim 23, wherein:
decoding the signals of the first RAT and the signals of the second RAT comprises: separating the output of the first Rx FFT into resource blocks (RBs) associated with the first RAT and RBs associated with the second RAT; and
the method further comprises: processing the RBs associated with the second RAT by applying a respective complex phase compensation value to each tone output.

25. The method of claim 22, wherein:
decoding the signals of the first RAT and the signals of the second RAT comprises: separating the output of the second Rx FFT into resource blocks (RBs) associated with the first RAT and RBs associated with the second RAT; and
the method further comprises: processing the RBs associated with the first RAT by applying a respective complex phase compensation value to each tone output.

26. A method for wireless communication, comprising:
encoding signals of a first radio access technology (RAT) and signals of a second RAT into first resource blocks (RBs) and second RBs, respectively;
identifying a first transmit (Tx) direct current (DC) location corresponding to the signals of the first RAT;

performing a first Tx inverse fast Fourier transform (iFFT) on the first RBs based on the first TX DC location;
identifying a second Tx DC location corresponding to the signals of the second RAT;
performing a second Tx iFFT on the second RBs based on the second Tx DC location; and
transmitting a combined signal that includes the signals of the first RAT and the signals of the second RAT that are frequency domain multiplexed in a same subframe, based on an output of the first Tx iFFT and the second Tx iFFT.

27. The method of claim 26, wherein performing the first Tx iFFT and performing the second Tx iFFT further comprises:
performing the first Tx iFFT and the second Tx iFFT by a first Tx chain and a second Tx chain, respectively, when the UE is uplink (UL) multiple-input multiple-output (MIMO) capable.

28. The method of claim 26, wherein performing the first Tx iFFT and performing the second Tx iFFT further comprises:
performing the first Tx iFFT and the second Tx iFFT by a first Tx chain and a second Tx chain, respectively, when the UE is uplink (UL) multiple-input multiple-output (MIMO) capable or intraband non-contiguous carrier aggregation (CA) capable, and the first Tx chain and the second Tx chain are independent of each other and each have separate power amplifiers (PAs).

\* \* \* \* \*